(12) United States Patent
Coomer

(10) Patent No.: US 8,255,572 B1
(45) Date of Patent: Aug. 28, 2012

(54) METHOD AND SYSTEM TO DETECT AND PREVENT E-MAIL SCAMS

(75) Inventor: Graham Coomer, Gloucester (GB)

(73) Assignee: Symantec Corporation, Mountain View, CA (US)

( * ) Notice: Subject to any disclaimer, the term of this patent is extended or adjusted under 35 U.S.C. 154(b) by 415 days.

(21) Appl. No.: 12/692,283

(22) Filed: Jan. 22, 2010

(51) Int. Cl.
*G06F 15/16* (2006.01)

(52) U.S. Cl. ............ 709/248; 709/206; 726/22; 726/23; 726/4

(58) Field of Classification Search ............ 726/22, 726/23, 4, 16; 709/203, 206, 217–228, 248; 713/150, 152
See application file for complete search history.

(56) References Cited

U.S. PATENT DOCUMENTS

| | | | |
|---|---|---|---|
| 2002/0133606 A1* | 9/2002 | Mitomo et al. | 709/229 |
| 2006/0007868 A1* | 1/2006 | Shinomiya | 370/241.1 |
| 2006/0020814 A1* | 1/2006 | Lieblich et al. | 713/182 |
| 2006/0036748 A1* | 2/2006 | Nusbaum et al. | 709/228 |
| 2006/0168042 A1* | 7/2006 | Boivie et al. | 709/206 |
| 2006/0253583 A1* | 11/2006 | Dixon et al. | 709/225 |
| 2006/0253584 A1* | 11/2006 | Dixon et al. | 709/225 |
| 2007/0174624 A1* | 7/2007 | Wolosewicz et al. | 713/176 |
| 2007/0250930 A1* | 10/2007 | Aziz et al. | 726/24 |
| 2008/0005782 A1* | 1/2008 | Aziz | 726/3 |
| 2008/0052359 A1* | 2/2008 | Golan et al. | 709/206 |
| 2008/0109473 A1* | 5/2008 | Dixon et al. | 707/102 |
| 2008/0114709 A1* | 5/2008 | Dixon et al. | 706/13 |

OTHER PUBLICATIONS

Chang, "An Analysis of Advance Fee Fraud on the Internet", *Journal of Financial Crime*, vol. 15, Issue 1, 2008, abstract, pp. 1-2 [online]. Retrieved on Mar. 9, 2010 from the Internet: <URL:http://www.emeraldinsight.com/Insight/viewContentItem.do?contentType=Article&hdAction=lnkhtml&contentId=1641907>.

IC3, "Internet Crime Schemes", Internet Crime Complaint Center, no date provided, pp. 1-7 [online]. Retrieved on Mar. 9, 2010 from the Internet: <URL:http://www.ic3.gov/crimeschemes.aspx>.

(Continued)

*Primary Examiner* — Jeffrey Pwu
*Assistant Examiner* — Nega Woldemariam
(74) *Attorney, Agent, or Firm* — McKay and Hodgson, LLP; Serge J. Hodgson; Sean P. Lewis

(57) ABSTRACT

A method and apparatus for identifying 419 messages in a live message stream whereby an incoming message in a live message stream is subjected to an anti-spam pipeline made up of multiple anti-spam stages or filters including a whitelist filter stage, a dynamic feedback-based heuristic filter stage, a 419 text-based heuristic filter stage, one or more metadata creating heuristic filter stages, and a metadata analysis stage. A message is removed from the live analysis of the anti-spam pipeline at any stage where the message is identified as either a potential 419 message or a potential legitimate message. Consequently, processing costs are minimized since no resources are used on messages that have already been classified as either a potential 419 message or a potential legitimate message. In addition, even when a given message is processed by the entire anti-spam pipeline, and the costs are incurred, the information obtained by the application of the entire anti-spam pipeline is used to supplement or update the dynamic feedback-based heuristic filter stage. Consequently, the cost of applying the entire anti-spam pipeline to a message is potentially offset by the valuable feedback results that are used to improve future processing speed and accuracy.

20 Claims, 4 Drawing Sheets

OTHER PUBLICATIONS

Saviol, "When Social Network Invites are Used for Nigerian/419 Scams", Mar. 12, 2009, pp. 1-2 [online]. Retrieved on Mar. 9, 2010 from the Internet: <URL:http://www.sophos.com/blogs/sophoslabs/v/post/3514>.

Wikipedia, "Advance-fee Fraud", no date provided, pp. 1-22 [online]. Retrieved on Mar. 9, 2010 from the Internet: <URL:http://en.wikipedia.org/wiki/Advance-fee_fraud>.

No author provided, "Predictive 419 and West African Scam Protection Database and Information—Nigerian Scam Sources", no date provided, p. 1 [online]. Retrieved on May 4, 2010 from the Internet: <URL:http://www.antibes.co.uk/scamavoidance.php>.

* cited by examiner

METHOD AND SYSTEM TO DETECT AND PREVENT E-MAIL SCAMS

BACKGROUND OF THE INVENTION

One major problem facing modern computing systems and communications systems is the prevalence of spam and/or scam electronic mail (e-mail), and/or other messages, that include malicious, unwanted, offensive, or nuisance content, such as, but is not limited to: any content that promotes and/or is associated with fraud; any content that includes "work from home" or "be our representative" offers/scams; any content that includes money laundering or so-called "mule spam"; any content that promotes and/or is associated with various financial scams; any content that promotes and/or is associated with any other criminal activity; and/or any content that promotes and/or is associated with harmful and/or otherwise undesirable content, whether illegal in a given jurisdiction or not.

One particularly troublesome, and at times dangerous, form of scam e-mail is the so called "Nigerian 419" message or "419 message". A typical 419 message is a form of advance-fee fraud in which the target is persuaded to advance sums of money in the hope of realizing a significantly larger gain. The number "419" refers to the article of the Nigerian Criminal Code (part of Chapter 38: "Obtaining Property by false pretences; Cheating") dealing with fraud. However, as discussed below, 419 messages are a global issue and problem.

A 419 message scam usually begins with an e-mail, or other message, purportedly sent to a selected recipient, but actually sent to many recipients in most cases, making an offer that would result in a large payoff for the victim. The e-mail's subject line often says something like "From the desk of Mr. [Name]", "Your assistance is needed", and so on. The details vary, but the usual story is that a person, often a government or bank employee, knows of a large amount of unclaimed money or gold which he cannot access directly, usually because he has no right to it. The sums involved are usually in the millions of dollars, and the investor is promised a large share, typically ten to forty percent, if they assist the scam character in retrieving the money. Whilst the vast majority of recipients do not respond to these e-mails, a very small percentage do, but this is often enough to make the fraud worthwhile as many millions of messages can be sent. Invariably sums of money which are substantial, but very much smaller than the promised profits, are said to be required in advance for bribes, fees, etc. This is the money being stolen from the victim, who thinks he or she is investing to make a huge profit.

419 message scammers often make use of low-volume and/or hand written e-mail messages, i.e., not automatically generated messages, to distribute the scam offer. In addition, 419 messages are often short-lived, i.e., have relatively short distribution times and are often very similar in content and format to legitimate messages. As a result, identifying 419 messages and quarantining them, or otherwise taking preventative/protective action, is often quite difficult.

Currently, methods and procedures for identifying 419 messages typically involve "off-line" analysis. For instance many current methods and procedures for identifying 419 messages rely on samples of 419 messages collected at one or more "honeypot" systems. A honeypot system is typically a decoy e-mail system established on a computing system, such as any computing system discussed herein, and/or known in the art at the time of filing, and/or as developed after the time of filing, to receive a large number of e-mails, and/or other messages, sent to decoy e-mail addresses. Generally, the decoy e-mail addresses don't belong, or no longer belong, to a genuine person or entity. Consequently, the e-mails received by the honeypot via the decoy e-mail addresses are typically not legitimate e-mails from legitimate senders. As a result, at a first cut, it generally is assumed that any e-mails sent to the decoy e-mail addresses, and received at the honeypot, are indeed spam. In operation, as the honeypot decoy e-mail addresses become known to spammers, more and more spammers typically add the spam e-mail honeypot decoy e-mail addresses to their user/victim e-mail address databases and more and more spam e-mails are sent to the spam e-mail honeypot decoy e-mail addresses. Inevitably, a percentage of these spam e-mails are 419 messages and then, once identified, these 419 messages are analyzed to identify common potential 419 message parameters. Currently, the potential 419 message parameters are then distributed to one or more security systems, and/or one or more real, live, e-mail systems, and/or one or more user computing systems, and the potential 419 message parameters are used to identify potential 419 messages and/or to initiate one or more actions to protect one or more users and/or user computing systems.

Another off-line method currently used to identify 419 messages is the use of user input, or another source of input. In some cases, a user of a message system and/or one or more security systems, or some other third party source, provides examples of 419 messages they have received. These 419 messages are then analyzed to identify common potential 419 message parameters. Then, once again, the potential 419 message parameters are distributed to one or more security systems, and/or one or more real, live, e-mail systems, and the potential 419 message parameters are used to identify potential 419 messages and/or to initiate one or more actions to protect one or more users and/or user computing systems.

While the currently used off-line methods and procedures for identifying 419 messages can be effective, these off-line methods suffer from significant time delays between when a 419 message is distributed and when the potential 419 message parameters are used to identify potential 419 messages and/or to initiate one or more actions to protect one or more users and/or user computing systems. This time delay is often on the order of hours, and sometimes on the order of days. This is a significant problem given that the life span of a given 419 message format can be quite short, on the order of minutes, and that every minute between when a 419 message is distributed and when the potential 419 message parameters are used to identify potential 419 messages often means thousands of 419 messages being successfully delivered. In addition, using the current off-line methods and procedures for identifying 419 messages, if a given sample 419 message type is not provided for analysis, either via interception by the honeypot system or from a user or another source, then the given 419 message type is never identified and/or stopped.

As noted above, to a large degree, the significant time delays between when a 419 message is distributed and when the potential 419 message parameters are used to identify potential 419 messages and/or to initiate one or more actions to protect one or more users and/or user computing systems using current methods for identifying 419 messages is a result of the fact that current methods for identifying 419 messages rely on off-line analysis. However, these off-line methods are still currently used because live or "real-time" analysis of messages to identify potential 419 messages is currently considered too expensive in terms of capital equipment, hosting costs, the processing costs, e.g., the processor time and/or cycles, time lag, i.e., the time lag associated with the processing and analysis, inconvenience cost associated with false positive results, database access and access time, disk access time, Input/Output (I/O) latencies, and/or various other costs associated with implementing a 419 identification system in a live e-mail or message stream/system.

As a result of the situation described above, currently, 419 messages remain extremely difficult to identify and isolate and, therefore, many of these harmful, and at times dangerous, e-mails still find their way to thousands of victims each year. Clearly, this is a far from ideal situation for the victims, but it is also a problem for all users of e-mail who must suffer with the delays of false positives and/or must be wary of all e-mails, even those of legitimate origin and intent.

SUMMARY

According to one embodiment, a method and system for identifying 419 messages in a live message stream includes a process for identifying 419 messages in a live message stream whereby an incoming message in a live message stream is subjected to an anti-spam pipeline made up of multiple anti-spam stages or filters. In one embodiment, the anti-spam pipeline includes a whitelist filter stage that analyzes incoming messages in the live message stream using one or more potential legitimate message parameters. In one embodiment, if, by virtue of the analysis provided by the whitelist filter stage, the message is deemed to be potentially legitimate, the message is removed from further analysis by the process for identifying 419 messages in a live message stream and, in one embodiment, is passed on to a user computer and/or another analysis system. On the other hand, in one embodiment, if, by virtue of the analysis provided by the whitelist filter stage, the message is not deemed to be potentially legitimate, the message is passed on to a dynamic feedback-based heuristic filter stage that analyzes incoming messages in the live message stream using heuristics utilizing one or more feedback-based potential 419 message parameters identified from 419 messages identified by historical applications of the process for identifying 419 messages in a live message stream. In one embodiment, if, by virtue of the analysis provided by the dynamic feedback-based heuristic filter stage, a message is deemed to be suspect, the message is removed from further live, or on-line, analysis by the process for identifying 419 messages in a live message stream and one or more protective actions are applied to the message. On the other hand, in one embodiment, if, by virtue of the analysis provided by the dynamic feedback-based heuristic filter stage, a message is not deemed to be suspect, the message is passed on to a 419 text-based heuristic filter stage that performs analysis of the text in the message body, headers, and footers to identify any text based 419 identification parameters commonly included in message text by 419 scammers. In one embodiment, if, by virtue of the analysis provided by the 419 text-based heuristic filter stage, a message is deemed to be suspect, the message is removed from further live, or on-line, analysis by the process for identifying 419 messages in a live message stream and one or more protective actions are applied to the message. On the other hand, in one embodiment, if, by virtue of the analysis provided by the 419 text-based heuristic filter stage, a message is not deemed to be suspect, the message is passed on to one or more metadata creating heuristic filter stages that analyze the message and generate a metadata set including one or more metadata entries associated with the message. In one embodiment, the metadata set associated with the message is then analyzed using one or more metadata-based 419 message identification parameters to determine if the message is a potential 419 message. In one embodiment, if, by virtue of this metadata analysis, a message is not deemed to be suspect, the message is removed from further live, or on-line, analysis by the process for identifying 419 messages in a live message stream, and in one embodiment, passed onto a user computing system or another analysis system. On the other hand, in one embodiment, if, by virtue of the metadata analysis, a message is deemed to be suspect, the message is further analyzed to identify one or more potential 419 message parameters associated with the message. In one embodiment, once one or more potential 419 message parameters associated with the message are identified, data representing the one or more potential 419 message parameters associated with the message is transformed into feedback-based potential 419 message parameter data and provided to the dynamic feedback-based heuristic filter stage to be used with one or more feedback-based heuristics. In one embodiment, the message deemed to be suspect is then subjected to one or more protective actions.

Using the method and system for identifying 419 messages in a live message stream, as discussed herein, 419 messages can be reliably identified in a live message stream, i.e., in relative "real time", using an anti-spam pipeline that includes, in one embodiment, a whitelist filter stage, a dynamic feedback-based heuristic filter stage, a 419 text-based heuristic filter stage, one or more metadata creating heuristic filter stages, and a metadata analysis stage. In addition, using the method and system for identifying 419 messages in a live message stream, as discussed herein, a message is removed from the live analysis of the anti-spam pipeline at any stage where the message is identified as either a potential 419 message or a potential legitimate message. Consequently, processing costs are minimized since no resources are used on messages that have already been classified as either a potential 419 message or a potential legitimate message. In addition, using the method and system for identifying 419 messages in a live message stream, as discussed herein, even when a given message is processed by the entire anti-spam pipeline, and the costs are incurred, the information obtained by the application of the entire anti-spam pipeline is used to teach and refine the method and system for identifying 419 messages in a live message stream, as discussed herein. Consequently, the cost of applying the entire anti-spam pipeline to a message is offset by the potentially valuable feedback based results that help improve future processing speed and accuracy.

As a result, using the method and system for identifying 419 messages in a live message stream, as discussed herein, far more of these harmful, and at times dangerous, 419 messages can be identified and stopped than is possible using currently available methods and systems.

BRIEF DESCRIPTION OF THE DRAWINGS

Common reference numerals are used throughout the FIG.s and the detailed description to indicate like elements.

Figure 1:
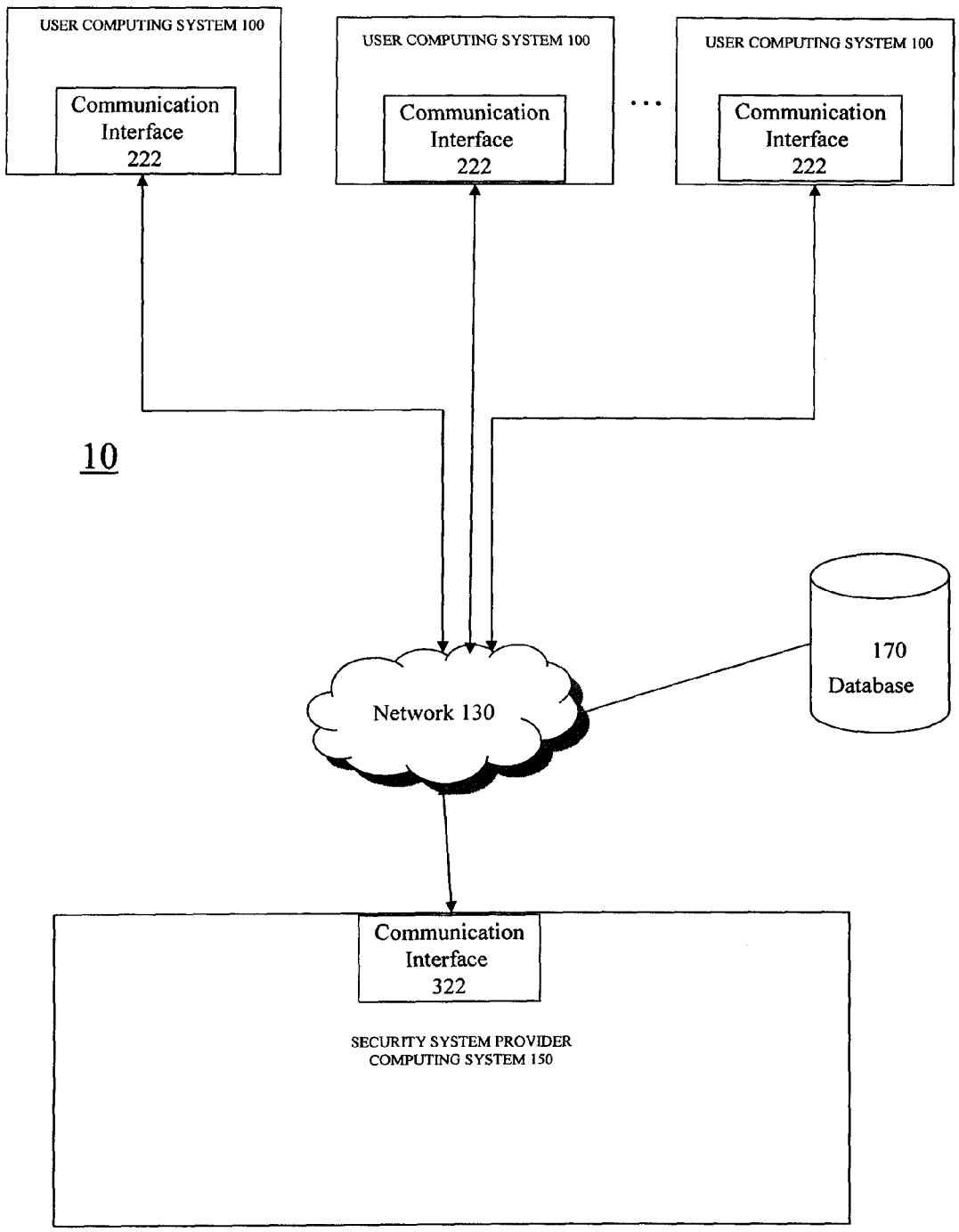
FIG. 1 is a block diagram of an exemplary hardware architecture for implementing one embodiment including user computing systems, a communication network, a database, and a security system provider computing system, in accordance with one embodiment.

One skilled in the art will readily recognize that the above FIG.s are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. The following description includes reference to specific embodiments for illustrative purposes. However, the illustrative discussion below is not intended to be exhaustive or to limit the invention to the precise forms disclosed. Many modifications and variations are possible in view of the teachings below. The embodiments discussed below were chosen and described in order to explain the principles of the invention, and its practical applications, to thereby enable others skilled in the art to utilize the invention and various embodiments with various modifications as may be suited to the particular use contemplated. Therefore, embodiments may be embodied in many different forms than those shown and discussed herein and should not be construed as limited to the embodiments set forth herein, shown in the FIG.s, and/or described below.

According to one embodiment, a method and system for identifying 419 messages in a live message stream includes a process for identifying 419 messages in a live message stream whereby an incoming message in a live message stream is subjected to an anti-spam pipeline made up of multiple anti-spam stages or filters.

In one embodiment, the anti-spam pipeline includes a whitelist filter stage. In one embodiment, the whitelist filter stage analyzes incoming messages in the live message stream using one or more potential legitimate message parameters. In one embodiment, the one or more potential legitimate message parameters are updated/supplemented using feedback from actual legitimate messages identified by historical applications of the process for identifying 419 messages in a live message stream to the live message stream.

In one embodiment, if, by virtue of the analysis performed by the whitelist filter stage, the message is deemed to be potentially legitimate, i.e., the message includes/matches a threshold number of the one or more potential legitimate message parameters, the message is removed from further analysis by the process for identifying 419 messages in a live message stream and, in one embodiment, is passed on to a user computer and/or another analysis system. On the other hand, in one embodiment, if, by virtue of the analysis performed by the whitelist filter stage, the message is not deemed to be potentially legitimate, the message is passed on to a dynamic feedback-based heuristic filter stage.

In one embodiment, the dynamic feedback-based heuristic filter stage analyzes incoming messages in the live message stream using heuristics utilizing one or more feedback-based potential 419 message parameters obtained from 419 messages identified by historical applications of the process for identifying 419 messages in a live message stream.

In one embodiment, if, by virtue of the analysis provided by the dynamic feedback-based heuristic filter stage, a message is deemed to be suspect, i.e., the message includes/matches a threshold number of the one or more feedback-based potential 419 message parameters, the message is removed from further live, or on-line, analysis by the process for identifying 419 messages in a live message stream and one or more protective actions are applied to the message. On the other hand, in one embodiment, if, by virtue of the analysis provided by the dynamic feedback-based heuristic filter stage, a message is not deemed to be suspect, the message is passed on to a 419 text-based heuristic filter stage.

In one embodiment, the 419 text-based heuristic filter stage performs analysis of the text in the message body, headers, and footers to identify any text based 419 identification parameters commonly included in message text by 419 scammers. In various embodiments, these text based 419 parameters can include, but are not limited to: common typing errors and grammatical errors; defined words such as "proposal", "opportunity", "transaction", "investment", etc.; defined phrases such as "transaction of mutual benefit", "investment proposal opportunity", "crave your indulgence", etc.; defined phone numbers and/or number/symbol sequences; or any other defined text and/or symbols. In one embodiment, if, by virtue of the analysis provided by the 419 text-based heuristic filter stage, a message is deemed to be suspect, i.e., the message includes/matches a threshold number of the one or more text based 419 identification parameters, the message is removed from further live, or on-line, analysis by the process for identifying 419 messages in a live message stream and one or more protective actions are applied to the message. On the other hand, in one embodiment, if, by virtue of the analysis provided by the 419 text-based heuristic filter stage, a message is not deemed to be suspect, the message is passed on to a one or more metadata creating heuristic filter stages.

In one embodiment, the one or more metadata creating heuristic filter stages analyze the message and, as a result of the analysis by the one or more metadata creating heuristic filter stages, a metadata set including one or more metadata entries, is created and associated with the message.

In one embodiment, the metadata set associated with the message is then analyzed by a metadata analysis stage using one or more metadata-based 419 message identification parameters to determine if the message is a potential 419 message.

In one embodiment if, by virtue of the analysis provided by the metadata analysis stage, a message is deemed not to be suspect, i.e., the message does not include/match a threshold number of the one or more metadata-based 419 message identification parameters, the message is removed from further analysis by the process for identifying 419 messages in a live message stream and, in one embodiment, is passed on to a user computer and/or another analysis system. On the other hand, in one embodiment, if, by virtue of the analysis provided by the metadata analysis stage, a message is deemed to be suspect, i.e., the message includes/matches a threshold number of the one or more metadata-based 419 message identification parameters, the message is further analyzed to identify one or more potential 419 message parameters associated with the message.

In one embodiment, once one or more potential 419 message parameters associated with the message are identified, data representing the one or more potential 419 message parameters associated with the message is transformed to feedback-based potential 419 message parameter data and provided to the dynamic feedback-based heuristic filter stage to be used to create one or more new feedback-based heuristics.

In one embodiment, the message deemed to be suspect by virtue of the analysis provided by the metadata analysis stage is then subjected to one or more protective actions.

In one embodiment if, by virtue of the analysis provided by the metadata analysis stage, a message is not deemed to be suspect, the message is further analyzed to identify one or more potential legitimate message parameters associated with the message. In one embodiment, once one or more potential legitimate message parameters associated with the message are identified, data representing the one or more potential legitimate message parameters associated with the message is transformed into feedback-based potential legitimate message parameter data and provided to the whitelist filter stage to be used to update/supplement the list of potential legitimate message parameters used by the whitelist filter stage.

FIG. 1 shows a block diagram of an exemplary hardware system 10 suitable for implementing one embodiment of a process for identifying 419 messages in a live message stream, such as exemplary process 400 of FIG. 4 discussed below. Returning to FIG. 1, exemplary hardware system 10 includes: one or more user computing system(s) 100, including communication interface(s) 222; security system provider computing system 150, including communication interface 322; and database 170; all communicating via communication interfaces 222 and 322 and network 130.

In one embodiment, one or more of user computing system(s) 100 are client computing systems. In one embodiment, one or more of user computing system(s) 100 are server computing systems that are, in turn, associated with one or more client computing systems. In one embodiment, one or more of user computing system(s) 100 are representative of multiple user computing systems. In one embodiment, one or more of user computing system(s) 100 are part of a cloud computing environment. In one embodiment, user computing system(s) 100 are used, and/or are accessible, by another computing system, such as security system provider computing system 150 (discussed below) or any one or more of other user computing system(s) 100.

As used herein, the term "computing system", such as is included in the terms "user computing system" and "security system provider computing system" includes, but is not limited to: a portable computer; a workstation; a two-way pager; a cellular telephone; a smart phone; a digital wireless telephone; a Personal Digital Assistant (PDA); a media player, i.e., an MP3 player and/or other music and/or video player; a server computer; an Internet appliance; or any other device that includes components that can execute all, or part, of any one of the processes and/or operations as described herein. In addition, as used herein, the term computing system, can denote, but is not limited to, computing systems made up of multiple: computers; wireless devices; cellular telephones; digital telephones; two-way pagers; PDAs; media players; server computers; or any desired combination of these devices, that are coupled to perform the processes and/or operations as described herein.

In various embodiments, user computing system(s) 100 can be any computing system as defined herein and/or as known in the art at the time of filing and/or as developed thereafter, that includes components that can execute all, or part, of a process for identifying 419 messages in a live message stream in accordance with at least one of the embodiments as described herein. A more detailed discussion of user computing system(s) 100 is provided below with respect to FIG. 2.

Returning to FIG. 1, in one embodiment, security system provider computing system 150 is any computing system as defined herein and/or as known in the art at the time of filing and/or as developed thereafter, that includes components that can execute all, or part, of a process for identifying 419 messages in a live message stream in accordance with at least one of the embodiments as described herein and is accessible by, controlled by, and/or otherwise associated with, a security system provider. As used herein, a security system provider includes, but is not limited to, any party, person, application, system, or entity that desires to identify and block the transmission of spam and/or scam e-mails.

In one embodiment, security system provider computing system 150 is representative of two or more security system provider computing systems. In one embodiment, security system provider computing system 150 is a client computing system associated with one or more server computing systems. In one embodiment, security system provider computing system 150 is a server computing system that is, in turn, associated with one or more client computing systems that are users of one more security systems provided through, or monitored by, the security system provider associated with security system provider computing system 150. In one embodiment, security system provider computing system 150 is part of a cloud computing environment. A more detailed discussion of security system provider computing system 150 is provided below with respect to FIG. 3.

Also shown in FIG. 1 is database 170. In one embodiment, database 170 is a data storage device, a designated server system or computing system, or a designated portion of one or more server systems or computing systems, such as computing system(s) 100 and/or security system provider computing system 150, or a distributed database, or an external and/or portable hard drive. In one embodiment, database 170 is a dedicated mass storage device implemented in software, hardware, or a combination of hardware and software. In one embodiment, database 170 is a web-based function. As discussed in more detail below, in one embodiment, database 170 is under the control of, or otherwise accessible by, a process for identifying 419 messages in a live message stream, and/or a provider of a security system and/or a security system provider computing system 150. In one embodiment, database 170 is part of a cloud computing environment.

In one embodiment, computing system(s) 100, security system provider computing system 150, and database 170, are coupled through network 130. In various embodiments, network 130 is any network, communications network, or network/communications network system such as, but not limited to, a peer-to-peer network, a hybrid peer-to-peer network, a Local Area Network (LAN), a Wide Area Network (WAN), a public network, such as the Internet, a private network, a cellular network, a combination of different network types, or other wireless, wired, and/or a wireless and wired combination network capable of allowing communication between two or more computing systems, as discussed herein, and/or available or known at the time of filing, and/or as developed after the time of filing.

In one embodiment, computing system(s) 100, security system provider computing system 150, and database 170, are coupled in a cloud computing environment.

Figure 2:
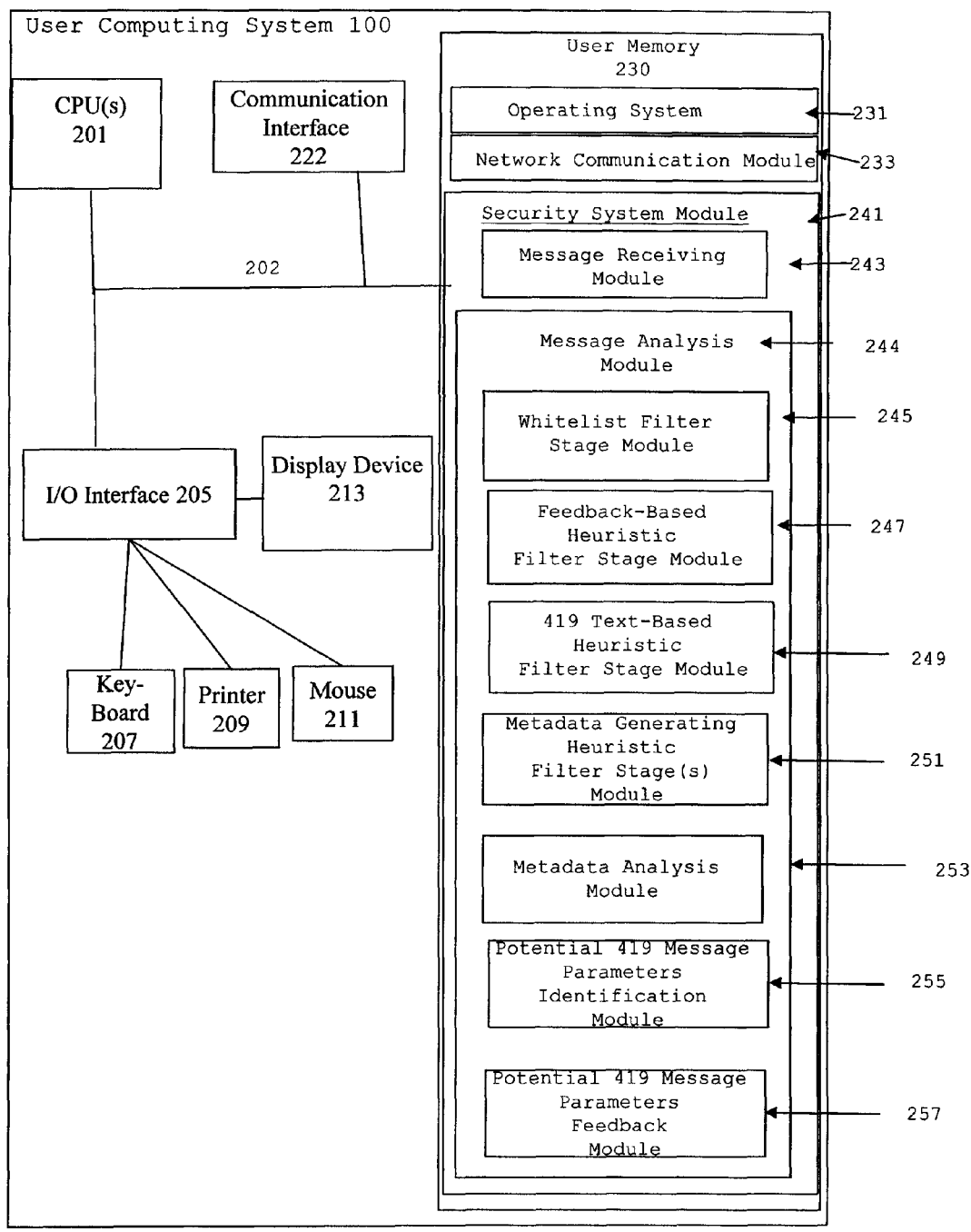
FIG. 2 is a block diagram of an exemplary user computing system of FIG. 1, in accordance with one embodiment.

FIG. 2 is a more detailed block diagram of an exemplary user computing system(s) 100. As seen in FIG. 2, in one embodiment, user computing system(s) 100 include(s) one or more Central Processing Unit(s), CPU(s) 201; user memory 230; at least one communication interface 222; an Input/Output interface, I/O interface 205, including one or more user interface devices such as display device 213, keyboard 207, printer 209, and/or mouse 211; all interconnected by one or more communication buses 202.

As also seen in FIG. 2, in one embodiment, user memory 230 can store data and/or instructions associated with, but not limited to, the following elements, subsets of elements, and/or super sets of elements for processing by one or more processors, such as CPU(s) 201 (FIG. 2) and/or 301 (FIG. 3): operating system 231 that includes procedures, data, and/or instructions for handling various services and performing/ coordinating hardware dependent tasks; network communications module 233 that includes procedures, data, and/or instructions, for, along with communication interface 222, connecting user computing system(s) 100 to other computing systems, such as other user computing system(s) 100 and/or security system provider computing system 150 of FIG. 1, and/or a network, such as network 130 of FIG. 1, and/or a database, such as database 170 of FIG. 1; and security system module 241 (FIG. 2) that includes procedures, data, and/or instructions, for intercepting and/or analyzing e-mails, or other messages, being sent to, or through, user computing system(s) 100 and/or security system provider computing system 150 of FIG. 1 to identify spam and/or scam e-mails and to take one or more protective measures.

As also seen in FIG. 2, in one embodiment, security system module 241 of user memory 230 includes: message receiving module 243 that includes, procedures, data, and/or instructions for receiving messages sent to user computing system(s) 100 via communication interface 222 and/or security system provider computing system 150 of FIG. 1; and message analysis module 244 that includes procedures, data, and/or instructions for scanning e-mails, or other messages, being sent to, or through, user computing system(s) 100 and/or security system provider computing system 150 of FIG. 1 to identify spam and/or scam e-mails and to take one or more protective measures.

As also seen in FIG. 2, in one embodiment, message analysis module 244 includes whitelist filter stage module 245 that includes procedures, data, and/or instructions, for analyzing incoming messages in the live message stream using one or more potential legitimate message parameters.

Figure 4:
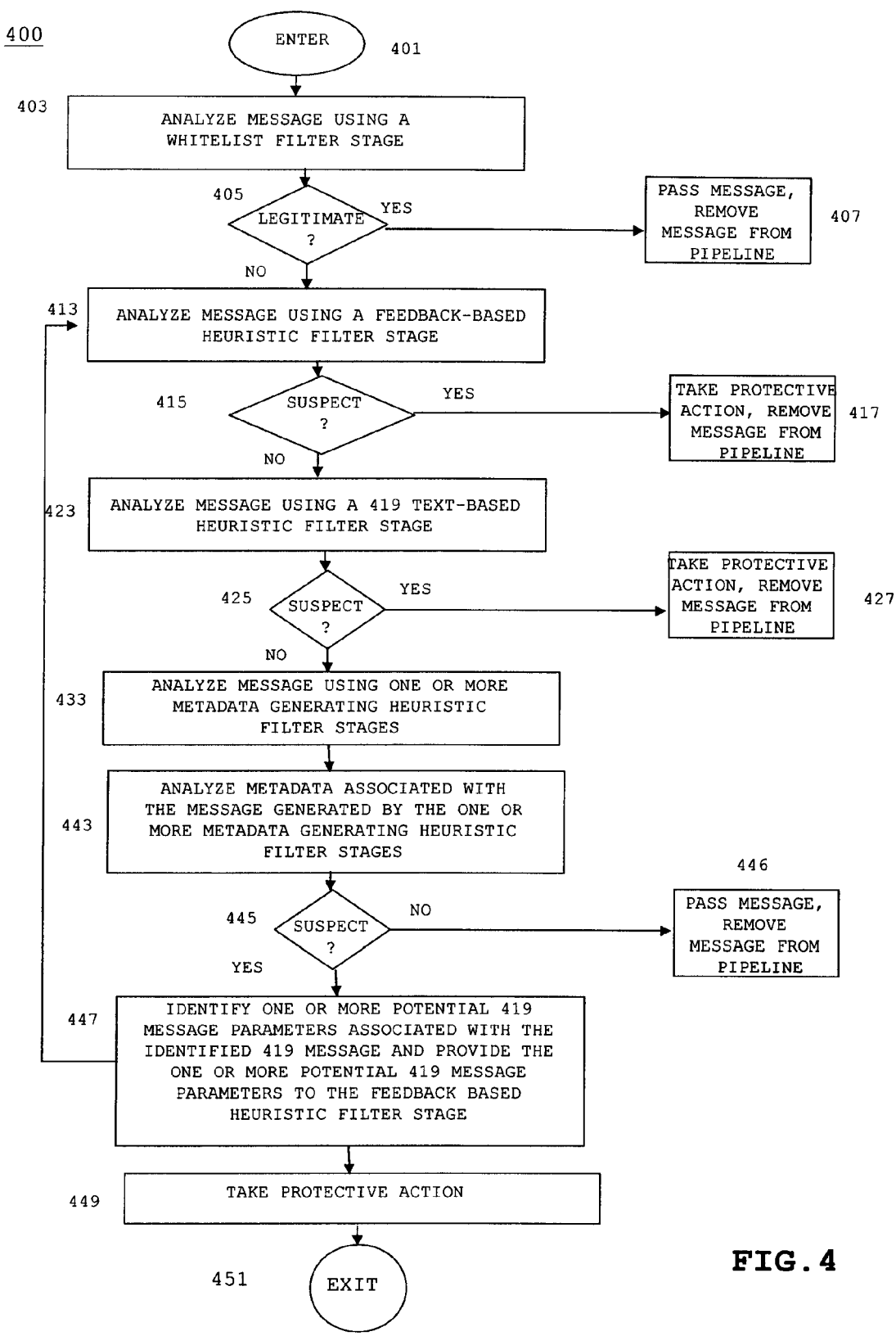
FIG. 4 is a flow chart depicting a process for identifying 419 messages in a live message stream in accordance with one embodiment.

As also seen in FIG. 2, in one embodiment, message analysis module 244 includes feedback-based heuristic filter stage module 247 that includes procedures, data, and/or instructions, for analyzing incoming messages in a live message stream using heuristics utilizing one or more feedback-based potential 419 message parameters identified from actual 419 messages identified by historical applications of a process for identifying 419 messages in a live message stream, such as process for identifying 419 messages in a live message stream 400 (FIG. 4).

As also seen in FIG. 2, in one embodiment, message analysis module 244 includes 419 text-based heuristic filter stage module 249 that includes procedures, data, and/or instructions, for analyzing the text in the message body, headers, and footers of incoming messages in the live message stream to identify any text based 419 identification parameters commonly included in message text by 419 scammers.

As also seen in FIG. 2, in one embodiment, message analysis module 244 includes metadata generating heuristic filter stage(s) module 251 that includes procedures, data, and/or instructions, for analyzing incoming messages in the live message stream and generating a metadata set including one or more metadata entries associated with the incoming messages.

As also seen in FIG. 2, in one embodiment, message analysis module 244 includes metadata analysis module 253 that includes procedures, data, and/or instructions, for analyzing the metadata sets associated with the incoming messages from metadata generating heuristic filter stage(s) module 251 using one or more metadata-based 419 message identification parameters to determine if the incoming messages are potential 419 messages.

As also seen in FIG. 2, in one embodiment, message analysis module 244 includes potential 419 message parameters identification module 255 that includes procedures, data, and/or instructions, for analyzing the identified potential 419 messages of metadata analysis module 253 to identify one or more potential 419 message parameters associated with the identified potential 419 messages.

As also seen in FIG. 2, in one embodiment, message analysis module 244 includes potential 419 message parameters feedback module 257 that includes procedures, data, and/or instructions, for transforming data representing the identified one or more potential 419 message parameters associated with the messages of potential 419 message parameters identification module 255 into feedback-based potential 419 message parameter data and providing the feedback-based potential 419 message parameter data to the dynamic feedback-based heuristic filter stage of feedback-based heuristic filter stage module 247 to be used to create one or more new feedback-based heuristics.

Those of skill in the art will readily recognize that the choice of components, data, modules, and information shown in FIG. 2, the organization of the components, data, modules, and information shown in FIG. 2, and the manner of storage and location of storage of the data, modules, and information shown in FIG. 2 was made for illustrative purposes only and that other choices of components, data, modules, and information, organization of the components, data, modules, and information, manner of storing, and location of storage, of the data, modules, and information can be implemented without departing from the scope of the invention as set forth in the claims below. In particular, the various modules and/or data shown in FIG. 2 are illustrative only and not limiting. In various other embodiments, the particular modules and/or data shown in FIG. 2 can be grouped together in fewer modules and/or data locations or divided among more modules and/or data locations. Consequently, those of skill in the art will recognize that other orders and/or grouping are possible and the particular modules and/or data, order, and/or grouping shown in FIG. 2 discussed herein do not limit the scope as claimed below.

A more detailed discussion of the operation of exemplary user computing system(s) 100, user memory 230, and security system module 241 of user memory 230, is provided below with respect to FIG. 4.

Figure 3:
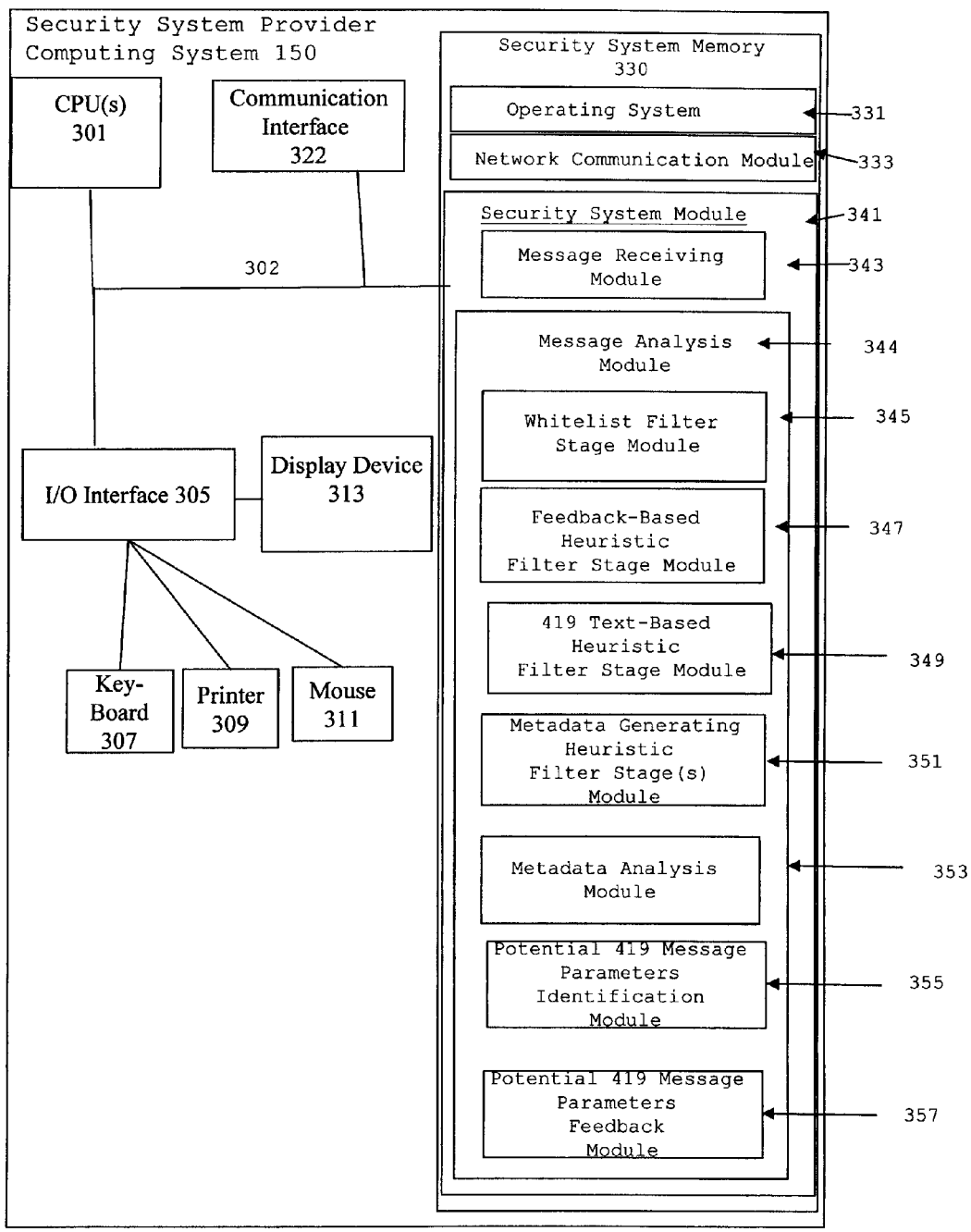
FIG. 3 is a block diagram of an exemplary security system provider computing system of FIG. 1, in accordance with one embodiment.

FIG. 3 is a more detailed block diagram of an exemplary security system provider computing system 150. As seen in FIG. 3, in one embodiment, security system provider computing system 150 includes one or more Central Processing Unit(s), CPU(s) 301; security system memory system 330; at least one communication interface 322; an Input/Output interface, I/O interface 305, including one or more user interface devices such as display device 313, keyboard 307, printer 309, and/or mouse 311; all interconnected by one or more communication buses 302.

As also seen in FIG. 3, in one embodiment, security system memory system 330 can store data and/or instructions associated with, but not limited to, the following elements, subsets of elements, and/or super sets of elements for use in processing by one or more processors, such as CPU(s) 201 (FIG. 2) and/or 301 (FIG. 3): operating system 331 that includes procedures, data, and/or instructions for handling various services and performing/coordinating hardware dependent tasks; network communications module 333 that includes procedures, data, and/or instructions, for, along with communication interface 322, connecting security system provider computing system 150 to other computing systems, such as user computing system(s) 100 and/or another security system provider computing system, and/or a network, such as network 130 of FIG. 1, and/or a database, such as database 170 of FIG. 1; and message analysis module 344 that includes procedures, data, and/or instructions for scanning e-mails, or other messages, being sent to, or through, user computing system(s) 100 and/or security system provider computing system 150 of FIG. 1 to identify spam and/or scam e-mails and to take one or more protective measures.

As also seen in FIG. 3, in one embodiment, security system module 341 of security system memory 330 includes: message receiving module 343 that includes procedures, data, and/or instructions for receiving messages sent to user computing system(s) 100 via security system provider computing system 150; and message analysis module 344 that includes procedures, data, and/or instructions for scanning e-mails, or other messages, being sent to user computing system(s) 100 through security system provider computing system 150 to identify spam and/or scam e-mails and to take one or more protective measures.

As also seen in FIG. 3, in one embodiment, message analysis module 344 includes whitelist filter stage module 345 that includes procedures, data, and/or instructions, for analyzing incoming messages in the live message stream using one or more potential legitimate message parameters.

As also seen in FIG. 3, in one embodiment, message analysis module 344 includes feedback-based heuristic filter stage module 347 that includes procedures, data, and/or instructions, for analyzing incoming messages in a live message stream using heuristics utilizing one or more feedback-based potential 419 message parameters identified from actual 419 messages identified by historical applications of a process for identifying 419 messages in a live message stream, such as process for identifying 419 messages in a live message stream 400 (FIG. 4).

As also seen in FIG. 3, in one embodiment, message analysis module 344 includes 419 text-based heuristic filter stage module 349 that includes procedures, data, and/or instructions, for analyzing the message text in the message body, headers, and footers of incoming messages in the live message stream to identify any text based 419 identification parameters commonly included in message text by 419 scammers.

As also seen in FIG. 3, in one embodiment, message analysis module 344 includes metadata generating heuristic filter stage(s) module 351 that includes procedures, data, and/or instructions, for analyzing incoming messages in the live message stream and generating a metadata set including one or more metadata entries associated with the incoming messages.

As also seen in FIG. 3, in one embodiment, message analysis module 344 includes metadata analysis module 353 that includes procedures, data, and/or instructions, for analyzing the metadata sets associated with the incoming messages from metadata generating heuristic filter stage(s) module 351 using one or more metadata-based 419 message identification parameters to determine if the incoming messages are potential 419 messages.

As also seen in FIG. 3, in one embodiment, message analysis module 344 includes potential 419 message parameters identification module 355 that includes procedures, data, and/or instructions, for analyzing the identified potential 419 messages of metadata analysis module 353 to identify one or more potential 419 message parameters associated with the identified potential 419 messages.

As also seen in FIG. 3, in one embodiment, message analysis module 344 includes potential 419 message parameters feedback module 357 that includes procedures, data, and/or instructions, for transforming data representing the identified one or more potential 419 message parameters associated with the messages of potential 419 message parameters identification module 355 into feedback-based potential 419 message parameter data and providing the feedback-based potential 419 message parameter data to the dynamic feedback-based heuristic filter stage of feedback-based heuristic filter stage module 347 to be used to create one or more new feedback-based heuristics.

Those of skill in the art will readily recognize that the choice of components, data, modules, and information shown in FIG. 3, the organization of the components, data, modules, and information shown in FIG. 3, and the manner of storage and location of storage of the data, modules, and information shown in FIG. 3 was made for illustrative purposes only and that other choices of components, data, modules, and information, organization of the components, data, modules, and information, manner of storing, and location of storage, of the data, modules, and information can be implemented without departing from the scope of the invention as set forth in the claims below. In particular, the various modules and/or data shown in FIG. 3 are illustrative only and not limiting. In various other embodiments, the particular modules and/or data shown in FIG. 3 can be grouped together in fewer modules and/or data locations or divided among more modules and/or data locations. Consequently, those of skill in the art will recognize that other orders and/or grouping are possible and the particular modules and/or data, order, and/or grouping shown in FIG. 3 discussed herein do not limit the scope as claimed below.

A more detailed discussion of the operation of exemplary security system provider computing system 150, security system memory system 330, security system module 341 of security system memory system 330 is provided below with respect to FIG. 4.

Process

According to one embodiment, a method and system for identifying 419 messages in a live message stream includes a process for identifying 419 messages in a live message stream whereby an incoming message in a live message stream is subjected to an anti-spam pipeline made up of multiple anti-spam stages or filters. In one embodiment, the anti-spam pipeline includes a whitelist filter stage that analyzes incoming messages in the live message stream using one or more potential legitimate message parameters. In one embodiment, if, by virtue of the analysis provided by the whitelist filter stage, the message is deemed to be potentially legitimate, the message is removed from further analysis by the process for identifying 419 messages in a live message stream and, in one embodiment, is passed on to a user computer. On the other hand, in one embodiment, if, by virtue of the analysis provided by the whitelist filter stage, the message is not deemed to be potentially legitimate, the message is passed on to a dynamic feedback-based heuristic filter stage that analyzes incoming messages in the live message stream using heuristics utilizing one or more feedback-based potential 419 message parameters identified from actual 419 messages identified by historical applications of the process for identifying 419 messages in a live message stream. In one embodiment, if, by virtue of the analysis provided by the dynamic feedback-based heuristic filter stage, a message is deemed to be suspect, the message is removed from further live, or on-line, analysis by the process for identifying 419 messages in a live message stream and one or more protective actions are applied to the message. On the other hand, in one embodiment, if, by virtue of the analysis provided by the dynamic feedback-based heuristic filter stage, a message is not deemed to be suspect, the message is passed on to a 419 text-based heuristic filter stage that performs analysis of the text in the message body, headers, and footers to identify any text based 419 identification parameters commonly included in message text by 419 scammers. In one embodiment, if, by virtue of the analysis provided by the 419 text-based heuristic filter stage, a message is deemed to be suspect, the message is removed from further live, or on-line, analysis by the process for identifying 419 messages in a live message stream and one or more protective actions are applied to the message. On the other hand, in one embodiment, if, by virtue of the analysis provided by the 419 text-based heuristic filter stage, a message is not deemed to be suspect, the message is passed on to a one or more metadata creating heuristic filter stages that analyze the message and generate a metadata set including one or more metadata entries associated with the message. In one embodiment, the metadata set associated with the message is then analyzed using one or more metadata-based 419 message identification parameters to determine if the message is a potential 419 message. In one embodiment, if, by virtue of this metadata analysis, a message is not deemed to be suspect, the message is removed from further live, or on-line, analysis by the process for identifying 419 messages in a live message stream, and in one embodiment, passed onto a user computing system or another analysis system. On the other hand, in one embodiment, if, by virtue of the metadata analysis, a message is deemed to be suspect, the message is further analyzed to identify one or more potential 419 message parameters associated with the message. In one embodiment, once one or more potential 419 message parameters associated with the message are identified, data representing the one or more potential 419 message parameters associated with the message is transformed into feedback-based potential 419 message parameter data and provided to the dynamic feedback-based heuristic filter stage to be used with one or more feedback-based heuristics. In one embodiment, the message deemed to be suspect is then subjected to one or more protective actions.

FIG. 4 is a flow chart depicting a process for identifying 419 messages in a live message stream 400 in accordance with one embodiment.

Process for identifying 419 messages in a live message stream 400 begins at ENTER OPERATION 401 and process flow proceeds to ANALYZE MESSAGE USING A WHITELIST FILTER STAGE OPERATION 403.

In one embodiment, at ANALYZE MESSAGE USING A WHITELIST FILTER STAGE OPERATION 403 an incoming message in a live message stream is subjected to an anti-spam pipeline made up of multiple anti-spam stages or filters that includes a whitelist filter stage.

In one embodiment, at ANALYZE MESSAGE USING A WHITELIST FILTER STAGE OPERATION 403 the anti-spam pipeline includes two or more filters, or "stages", with each filter/stage being implemented to identify, and/or block, and/or or filter out, undesirable content based on specific types of heuristics. In one embodiment, at ANALYZE MESSAGE USING A WHITELIST FILTER STAGE OPERATION 403, an e-mail, IM, file, or other message, is subjected to each filter/stage of the anti-spam pipeline in a defined sequence. However, each filter/stage has an associated filter/stage cost. This filter/stage cost is typically made up of, but is not limited to, one or more of the following filter/stage cost components: the cost of capital equipment necessary to implement the given filter/stage, e.g., the cost of the servers, routers, and other hardware necessary to implement the given filter/stage; the hosting costs associated with the given filter/stage, such as data center costs associated with the given filter/stage; the processing costs associated with the given filter/stage, e.g., the processor time and/or cycles associated with implementing the given filter/stage; the time lag and inconvenience cost associated with false positive results; database access and access time associated with implementing the given filter/stage; disk access time associated with implementing the given filter/stage; Input/Output (I/O) latencies associated with implementing the given filter/stage; and/or various other costs associated with implementing each filter/stage.

As a result of the costs associated with implementing each filter/stage, as discussed below, once an e-mail, IM, file, or other message is identified as either suspect or legitimate by a given filter/stage, the e-mail, IM, file, or other message is typically taken out of the filtering sequence to avoid wasting further filtering resources on a determined problematic e-mail, IM, file, or other message.

In one embodiment, at ANALYZE MESSAGE USING A WHITELIST FILTER STAGE OPERATION 403 a whitelist filter stage is provided that analyzes incoming messages in the live message stream using one or more potential legitimate message parameters.

In one embodiment, at ANALYZE MESSAGE USING A WHITELIST FILTER STAGE OPERATION 403 the potential legitimate message parameters are message parameters that have been historically shown to be associated with legitimate messages, such as, but not limited to: specific text such as, "I am out of the office" or any vacation/out of office reply; any text indicating the sender is unable to respond; addresses and/or other data associated with known safe senders; attached URLs associated with known safe senders; phone numbers associated with known safe senders; points of origin associated with known safe senders; or any potential legitimate message parameter desired and/or defined by the provider of process for identifying 419 messages in a live message stream and/or one or more users.

In various embodiments, at ANALYZE MESSAGE USING A WHITELIST FILTER STAGE OPERATION 403 data representing the potential legitimate message parameters is entered into a computing system, such as user computing system(s) 100 of FIGS. 1 and 2 and/or a security system provider's computing system, such as security system provider computing system 150 of FIGS. 1 and 3.

Returning to FIG. 4, in various embodiments, at ANALYZE MESSAGE USING A WHITELIST FILTER STAGE OPERATION 403 at least part of the data representing the potential legitimate message parameters is entered into a computing system, such as user computing system(s) 100 of FIGS. 1 and 2 and/or a security system provider's computing system, such as security system provider computing system 150 of FIGS. 1 and 3 via one or more user interface devices such as, but not limited to, keyboards 207 and 307, mice 211 and 311, a touchpad, a touch screen, voice recognition and/or command software, or any other device for converting user actions into one or more computing system instructions as discussed herein, and/or as known in the art at the time of filing, and/or as developed after the time of filing.

Returning to FIG. 4, in various embodiments, at ANALYZE MESSAGE USING A WHITELIST FILTER STAGE OPERATION 403 at least part of the data representing the potential legitimate message parameters is entered into a security system module, such as security system modules 241 and/or 341 of FIGS. 2 and 3, used to monitor e-mails, or other messages, coming into, and/or through, a computing system. In one embodiment, the security system is implemented, in whole or in part: on a given user's computing system, such as user computing system(s) 100 of FIGS. 1 and 2; on a security system provider's computing system, such as security system provider computing system 150 of FIGS. 1 and 3; on a third party computing system; on a server computing system; or on any combination of a given user's computing system, a security system provider's computing system, a server computing system, and/or a third party computing system.

Returning to FIG. 4, in various embodiments, at ANALYZE MESSAGE USING A WHITELIST FILTER STAGE OPERATION 403 at least part of the data representing the potential legitimate message parameters resides on the user computing system, such as user computing system(s) 100 of FIGS. 1 and 2. As noted above, in some embodiments, a user computing system includes a user memory system, such as user memory 230 (FIG. 2) that can store data and/or instructions associated with, but not limited to, a security system in a security system module, such as security system module 241 (FIG. 2) that includes procedures, data, and/or instructions, used by one or more processors, such as CPU(s) 201 (FIG. 2) and CPU(s) 301 (FIG. 3), for monitoring e-mail, or other messages, coming into, and/or through, the user computing system, such as user computing system(s) 100, and/or communicating with a security system provider computing system, such as security system provider computing system 150, of FIG. 1.

Returning to FIG. 4, in various embodiments, at ANALYZE MESSAGE USING A WHITELIST FILTER STAGE OPERATION 403 at least part of the data representing the potential legitimate message parameters resides on the security system provider computing system, such as security system provider computing system(s) 150 of FIGS. 1 and 3. As noted above, in some embodiments, a security system provider computing system includes a security system memory system, such as security system memory 330 (FIG. 3) that can store data and/or instructions associated with, but not limited to, a security system in a security system module, such as security system module 341 (FIG. 3) that includes procedures, data, and/or instructions, used by one or more processors, such as CPU(s) 201 (FIG. 2) and CPU(s) 301 (FIG. 3), for monitoring e-mail, or other messages, coming into, and/or through, the user computing system, such as user computing system(s) 100, and/or communicating with a security system provider computing system, such as security system provider computing system 150, of FIG. 1.

As discussed below, in one embodiment, at ANALYZE MESSAGE USING A WHITELIST FILTER STAGE OPERATION 403 the whitelist filter stage receives feedback-based potential legitimate message parameters from IDENTIFY ONE OR MORE POTENTIAL 419 MESSAGE PARAMETERS ASSOCIATED WITH THE IDENTIFIED 419 MESSAGE AND PROVIDE THE ONE OR MORE POTENTIAL 419 MESSAGE PARAMETERS TO THE FEEDBACK BASED HEURISTIC FILTER STAGE OPERATION 447. In one embodiment, the feedback-based potential legitimate message parameters are derived from actual legitimate messages identified by historical applications of the process for identifying 419 messages in a live message stream.

In one embodiment, at ANALYZE MESSAGE USING A WHITELIST FILTER STAGE OPERATION 403 the whitelist filter stage analyzes incoming messages in the live message stream using heuristics utilizing the potential legitimate message parameters using, and/or under the direction of, one or more processors, such as CPU(s) 201 and/or 301 of FIGS. 2 and 3, associated with one or more computing systems, such as computing systems 100 and/or 150 of FIGS. 1, 2, and 3.

Returning to FIG. 4, in one embodiment, once an anti-spam pipeline is provided that includes a whitelist filter stage that analyzes incoming messages in the live message stream using one or more potential legitimate message parameters at ANALYZE MESSAGE USING A WHITELIST FILTER STAGE OPERATION 403, process flow proceeds to LEGITIMATE ? OPERATION 405.

In one embodiment, at LEGITIMATE? OPERATION 405 a determination is made by virtue of the analysis provided by the whitelist filter stage at ANALYZE MESSAGE USING A WHITELIST FILTER STAGE OPERATION 403 as to whether or not a message is a potential legitimate message.

In one embodiment, if, by virtue of the analysis provided by the whitelist filter stage at ANALYZE MESSAGE USING A WHITELIST FILTER STAGE OPERATION 403, a message is deemed to be legitimate, i.e., the message includes/matches a threshold number of the one or more potential legitimate message parameters of ANALYZE MESSAGE USING A WHITELIST FILTER STAGE OPERATION 403, process flow proceeds to PASS MESSAGE, REMOVE MESSAGE FROM PIPELINE OPERATION 407.

In one embodiment, at PASS MESSAGE, REMOVE MESSAGE FROM PIPELINE OPERATION 407 data representing the status of the message is transformed to data indicating a status of potentially legitimate and the message is removed from further live, or on-line, analysis by process for identifying 419 messages in a live message stream 400.

On the other hand, if, by virtue of the analysis provided by the whitelist filter stage of ANALYZE MESSAGE USING A WHITELIST FILTER STAGE OPERATION 403, a message is not deemed to be legitimate, i.e., the message doe not include/match a threshold number of the one or more potential legitimate message parameters of ANALYZE MESSAGE USING A WHITELIST FILTER STAGE OPERATION 403, the analysis is considered inconclusive and process flow proceeds to ANALYZE MESSAGE USING A FEEDBACK-BASED HEURISTIC FILTER STAGE OPERATION 413.

In one embodiment, at ANALYZE MESSAGE USING A FEEDBACK-BASED HEURISTIC FILTER STAGE OPERATION 413, the feedback-based heuristic filter stage analyzes incoming messages in the live message stream using heuristics utilizing one or more feedback-based potential 419 message parameters obtained from actual 419 messages identified by historical applications of the process for identifying 419 messages in a live message stream.

As discussed below, in one embodiment, at ANALYZE MESSAGE USING A FEEDBACK-BASED HEURISTIC FILTER STAGE OPERATION 413 the dynamic feedback-based heuristic filter stage receives feedback-based potential 419 message parameters from IDENTIFY ONE OR MORE POTENTIAL 419 MESSAGE PARAMETERS ASSOCIATED WITH THE IDENTIFIED 419 MESSAGE AND PROVIDE THE ONE OR MORE POTENTIAL 419 MESSAGE PARAMETERS TO THE FEEDBACK BASED HEURISTIC FILTER STAGE OPERATION 447. In one embodiment, the feedback-based potential 419 message parameters are derived from actual 419 messages identified by previous applications of process for identifying 419 messages in a live message stream 400.

In various embodiments, at ANALYZE MESSAGE USING A FEEDBACK-BASED HEURISTIC FILTER STAGE OPERATION 413 the one or more feedback-based potential 419 message parameters are any feedback-based potential 419 message parameters that have been historically shown to be associated with 419 messages such as defined senders, defined sender systems, attached URLs, phone numbers, points of origin, text, formatting, etc.

In various embodiments, at ANALYZE MESSAGE USING A FEEDBACK-BASED HEURISTIC FILTER STAGE OPERATION 413 data representing the one or more feedback-based potential 419 message parameters is entered into a computing system, such as user computing system(s) 100 of FIGS. 1 and 2 and/or a security system provider's computing system, such as security system provider computing system 150 of FIGS. 1 and 3.

In various embodiments, at ANALYZE MESSAGE USING A FEEDBACK-BASED HEURISTIC FILTER STAGE OPERATION 413 data representing the one or more feedback-based potential 419 message parameters is entered into a security system module, such as security system modules 241 and/or 341 of FIGS. 2 and 3, used to monitor e-mails, or other messages, coming into, and/or through, a computing system. In one embodiment, the security system is a software application, a software module, a hardware device, and/or a combination of software and hardware, implemented, in whole or in part: on a given user's computing system, such as user computing system(s) 100 of FIGS. 1 and 2; on a security system provider's computing system, such as security system provider computing system 150 of FIGS. 1 and 3; on a third party computing system; on a server computing system; or on any combination of a given user's computing system, a security system provider's computing system, a server computing system, and/or a third party computing system.

Returning to FIG. 4, in some embodiments, at least part of the data representing the one or more feedback-based potential 419 message parameters resides on the user computing system, such as user computing system(s) 100 of FIGS. 1 and 2. As noted above, in some embodiments, a user computing system includes a user memory system, such as user memory 230 (FIG. 2) that can store data and/or instructions associated with, but not limited to, a security system in a security system module, such as security system module 241 (FIG. 2) that includes procedures, data, and/or instructions, used by one or more processors, such as CPU(s) 201 (FIG. 2) and CPU(s) 301 (FIG. 3), for monitoring e-mail, or other messages, coming into, and/or through, the user computing system, such as user computing system(s) 100, and/or communicating with a security system provider computing system, such as security system provider computing system 150, of FIG. 1.

Returning to FIG. 4, in some embodiments, at least part of the data representing the one or more feedback-based potential 419 message parameters resides on the security system provider computing system, such as security system provider computing system(s) 150 of FIGS. 1 and 3. As noted above, in some embodiments, a security system provider computing system includes a security system memory system, such as security system memory 330 (FIG. 3) that can store data and/or instructions associated with, but not limited to, a security system in a security system module, such as security system module 341 (FIG. 3) that includes procedures, data, and/or instructions, used by one or more processors, such as CPU(s) 201 (FIG. 2) and CPU(s) 301 (FIG. 3), for monitoring e-mail, or other messages, coming into, and/or through, the user computing system, such as user computing system(s) 100, and/or communicating with a security system provider computing system, such as security system provider computing system 150, of FIG. 1.

In one embodiment, at ANALYZE MESSAGE USING A FEEDBACK-BASED HEURISTIC FILTER STAGE OPERATION 413, the feedback-based heuristic filter stage analyzes incoming messages in the live message stream using heuristics utilizing one or more feedback-based potential 419 message parameters obtained from actual 419 messages identified by historical applications of the process for identifying 419 messages in a live message stream using, and/or under the direction of, one or more processors, such as CPU(s) 201 and/or 301 of FIGS. 2 and 3, associated with one or more computing systems, such as computing systems 100 and/or 150 of FIGS. 1, 2, and 3.

In one embodiment, once the feedback-based heuristic filter stage analyzes incoming messages in the live message stream using heuristics utilizing one or more feedback-based potential 419 message parameters obtained from actual 419 messages identified by historical applications of the process for identifying 419 messages in a live message stream at ANALYZE MESSAGE USING A FEEDBACK-BASED HEURISTIC FILTER STAGE OPERATION 413 process flow proceeds to SUSPECT? OPERATION 415.

In one embodiment, at SUSPECT? OPERATION 415 a determination is made by virtue of the analysis provided by the dynamic feedback-based heuristic filter stage at ANALYZE MESSAGE USING A FEEDBACK-BASED HEURISTIC FILTER STAGE OPERATION 413, as to whether or not a message is a potential 419 message.

In one embodiment, if, by virtue of the analysis provided by the dynamic feedback-based heuristic filter stage at ANALYZE MESSAGE USING A FEEDBACK-BASED HEURISTIC FILTER STAGE OPERATION 413, a message is deemed to be suspect, i.e., the message includes/matches a threshold number of the one or more feedback-based potential 419 message parameters of ANALYZE MESSAGE USING A FEEDBACK-BASED HEURISTIC FILTER STAGE OPERATION 413, process flow proceeds to TAKE PROTECTIVE ACTION, REMOVE MESSAGE FROM PIPELINE OPERATION 417.

In one embodiment, at TAKE PROTECTIVE ACTION, REMOVE MESSAGE FROM PIPELINE OPERATION 417 the message is removed from further live, or on-line, analysis by process for identifying 419 messages in a live message stream 400, data representing the status of the message is transformed to data indicating a status of a potential 419 message, and one or more protective actions are applied to the message.

In one embodiment, the one or more protective actions of TAKE PROTECTIVE ACTION, REMOVE MESSAGE FROM PIPELINE OPERATION 417 include, but are not limited to: blocking; quarantining; further analysis; labeling and/or tagging as spam/scam or potential spam/scam; redirection to a specific address and/or location for further processing; buffering; or any other protective measure discussed herein, and/or as known in the art at the time of filing, and/or as developed after the time of filing.

On the other hand, if, by virtue of the analysis provided by the dynamic feedback-based heuristic filter stage at ANALYZE MESSAGE USING A FEEDBACK-BASED HEURISTIC FILTER STAGE OPERATION 413, a message is not deemed to be suspect, i.e., the message does not include/match a threshold number of the one or more feedback-based potential 419 message parameters of ANALYZE MESSAGE USING A FEEDBACK-BASED HEURISTIC FILTER STAGE OPERATION 413, the analysis is considered inconclusive and process flow proceeds to ANALYZE MESSAGE USING A 419 TEXT-BASED HEURISTIC FILTER STAGE OPERATION 423.

In one embodiment, at ANALYZE MESSAGE USING A 419 TEXT-BASED HEURISTIC FILTER STAGE OPERATION 423 a 419 text-based heuristic filter stage is provided that performs analysis of the message including text in the message body, headers, and footers to identify any text based 419 identification parameters commonly included in message text by 419 scammers.

In one embodiment, at ANALYZE MESSAGE USING A 419 TEXT-BASED HEURISTIC FILTER STAGE OPERA- TION 423 the 419 text-based heuristic filter stage performs analysis of the text in the message body, headers, and footers to identify any text based 419 identification parameters commonly included in message text by 419 scammers that include, but are not limited to: common typing errors and grammatical errors; defined words such as "proposal", "opportunity", "transaction", "investment", etc.; defined phrases such as "transaction of mutual benefit", "investment proposal opportunity", "crave your indulgence", etc.; defined phone numbers and/or number/symbol sequences; or any other text based 419 identification parameters desired and/or defined by the provider of process for identifying 419 messages in a live message stream 400 and/or one or more users.

In various embodiments, at ANALYZE MESSAGE USING A 419 TEXT-BASED HEURISTIC FILTER STAGE OPERATION 423 at least part of the data representing the text based 419 identification parameters is entered into a computing system, such as user computing system(s) 100 of FIGS. 1 and 2 and/or a security system provider's computing system, such as security system provider computing system 150 of FIGS. 1 and 3 via one or more user interface devices such as, but not limited to, keyboards 207 and 307, mice 211 and 311, a touchpad, a touch screen, voice recognition and/or command software, or any other device for converting user actions into one or more computing system instructions as discussed herein, and/or as known in the art at the time of filing, and/or as developed after the time of filing.

Returning to FIG. 4, in various embodiments, at ANALYZE MESSAGE USING A 419 TEXT-BASED HEURISTIC FILTER STAGE OPERATION 423 at least part of the data representing the text based 419 identification parameters is entered into a security system module, such as security system modules 241 and/or 341 of FIGS. 2 and 3, used to monitor e-mails, or other messages, coming into, and/or through, a computing system. In one embodiment, the security system is implemented, in whole or in part: on a given user's computing system, such as user computing system(s) 100 of FIGS. 1 and 2; on a security system provider's computing system, such as security system provider computing system 150 of FIGS. 1 and 3; on a third party computing system; on a server computing system; or on any combination of a given user's computing system, a security system provider's computing system, a server computing system, and/or a third party computing system.

Returning to FIG. 4, in various embodiments, at ANALYZE MESSAGE USING A 419 TEXT-BASED HEURISTIC FILTER STAGE OPERATION 423 at least part of the data representing the text based 419 identification parameters resides on the user computing system, such as user computing system(s) 100 of FIGS. 1 and 2. As noted above, in some embodiments, a user computing system includes a user memory system, such as user memory 230 (FIG. 2) that can store data and/or instructions associated with, but not limited to, a security system in a security system module, such as security system module 241 (FIG. 2) that includes procedures, data, and/or instructions, used by one or more processors, such as CPU(s) 201 (FIG. 2) and CPU(s) 301 (FIG. 3), for monitoring e-mail, or other messages, coming into, and/or through, the user computing system, such as user computing system(s) 100, and/or communicating with a security system provider computing system, such as security system provider computing system 150, of FIG. 1.

Returning to FIG. 4, in various embodiments, at ANALYZE MESSAGE USING A 419 TEXT-BASED HEURISTIC FILTER STAGE OPERATION 423 at least part of the data representing the text based 419 identification parameters resides on the security system provider computing system, such as security system provider computing system(s) 150 of FIGS. 1 and 3. As noted above, in some embodiments, a security system provider computing system includes a security system memory system, such as security system memory 330 (FIG. 3) that can store data and/or instructions associated with, but not limited to, a security system in a security system module, such as security system module 341 (FIG. 3) that includes procedures, data, and/or instructions, used by one or more processors, such as CPU(s) 201 (FIG. 2) and CPU(s) 301 (FIG. 3), for monitoring e-mail, or other messages, coming into, and/or through, the user computing system, such as user computing system(s) 100, and/or communicating with a security system provider computing system, such as security system provider computing system 150, of FIG. 1.

Returning to FIG. 4 in one embodiment, at ANALYZE MESSAGE USING A 419 TEXT-BASED HEURISTIC FILTER STAGE OPERATION 423 the 419 text-based heuristic filter stage performs analysis of the message text in the message body, headers, and footers to identify any text based 419 identification parameters commonly included in message text by 419 using, and/or under the direction of, one or more processors, such as CPU(s) 201 and/or 301 of FIGS. 2 and 3, associated with one or more computing systems, such as computing systems 100 and/or 150 of FIGS. 1, 2, and 3.

Returning to FIG. 4 in one embodiment, once a 419 text-based heuristic filter stage is provided that performs analysis of the message including text in the message body, headers, and footers to identify any text based 419 identification parameters commonly included in message text by 419 scammers at ANALYZE MESSAGE USING A 419 TEXT-BASED HEURISTIC FILTER STAGE OPERATION 423 process flow proceeds to SUSPECT? OPERATION 425.

In one embodiment, at SUSPECT? OPERATION 425 a determination is made by virtue of the analysis provided by the 419 text-based heuristic filter stage at ANALYZE MESSAGE USING A 419 TEXT-BASED HEURISTIC FILTER STAGE OPERATION 423, as to whether or not a message is a potential 419 message.

In one embodiment, if, by virtue of the analysis provided by the 419 text-based heuristic filter stage at ANALYZE MESSAGE USING A 419 TEXT-BASED HEURISTIC FILTER STAGE OPERATION 423, a message is deemed to be suspect, i.e., the message includes/matches a threshold number of the one or more text based 419 identification parameters of ANALYZE MESSAGE USING A 419 TEXT-BASED HEURISTIC FILTER STAGE OPERATION 423, process flow proceeds to TAKE PROTECTIVE ACTION, REMOVE MESSAGE FROM PIPELINE OPERATION 427.

In one embodiment, at TAKE PROTECTIVE ACTION, REMOVE MESSAGE FROM PIPELINE OPERATION 427 the message is removed from further live, or on-line, analysis by process for identifying 419 messages in a live message stream 400, data representing the status of the message is transformed to data indicating a status of a potential 419 message, and one or more protective actions are applied to the message.

In one embodiment, the one or more protective actions of TAKE PROTECTIVE ACTION, REMOVE MESSAGE FROM PIPELINE OPERATION 427 include, but are not limited to: blocking; quarantining; further analysis; labeling and/or tagging as spam/scam or potential spam/scam; redirection to a specific address and/or location for further processing; buffering; or any other protective measure discussed herein, and/or as known in the art at the time of filing, and/or as developed after the time of filing.

On the other hand, if, by virtue of the analysis provided by the dynamic feedback-based heuristic filter stage at ANA- LYZE MESSAGE USING A 419 TEXT-BASED HEURISTIC FILTER STAGE OPERATION 423, a message is not deemed to be suspect, i.e., the message does not include/match a threshold number of the one or more text based 419 identification parameters of ANALYZE MESSAGE USING A 419 TEXT-BASED HEURISTIC FILTER STAGE OPERATION 423, the analysis is considered inconclusive and process flow proceeds to ANALYZE MESSAGE USING ONE OR MORE METADATA GENERATING HEURISTIC FILTER STAGES OPERATION 433.

In one embodiment, at ANALYZE MESSAGE USING ONE OR MORE METADATA GENERATING HEURISTIC FILTER STAGES OPERATION 433 one or more metadata creating heuristic filter stages are provided that analyze the message and generate a metadata set including one or more metadata entries associated with the message.

In one embodiment, at ANALYZE MESSAGE USING ONE OR MORE METADATA GENERATING HEURISTIC FILTER STAGES OPERATION 433 the one or more metadata creating heuristic filter stages analyze the message and, as a result of the analysis by the one or more metadata creating heuristic filter stages, a metadata set including one or more metadata entries, is created and associated with the message using, and/or under the direction of, one or more processors, such as CPU(s) 201 and/or 301 of FIGS. 2 and 3, associated with one or more computing systems, such as computing systems 100 and/or 150 of FIGS. 1, 2, and 3.

In some embodiments, at ANALYZE MESSAGE USING ONE OR MORE METADATA GENERATING HEURISTIC FILTER STAGES OPERATION 433 the one or more metadata creating heuristic filter stages that are provided to analyze the message and generate a metadata set including one or more metadata entries associated with the message include relatively complex heuristics implemented based on various parameters. Consequently, in some embodiments, the one or more metadata creating heuristic filter stages provided at ANALYZE MESSAGE USING ONE OR MORE METADATA GENERATING HEURISTIC FILTER STAGES OPERATION 433 are relatively costly in terms of the capital equipment, hosting costs, the processing costs, e.g., the processor time and/or cycles, time lag, i.e., the time lag associated with the processing and analysis, inconvenience cost associated with false positive results, database access and access time, disk access time, Input/Output (I/O) latencies, and/or various other costs associated with various metadata creating heuristic filter stages.

In one embodiment, once one or more metadata creating heuristic filter stages are provided that analyze the message and generate a metadata set including one or more metadata entries associated with the message at ANALYZE MESSAGE USING ONE OR MORE METADATA GENERATING HEURISTIC FILTER STAGES OPERATION 433, process flow proceeds to ANALYZE METADATA ASSOCIATED WITH THE MESSAGE GENERATED BY THE ONE OR MORE METADATA GENERATING HEURISTIC FILTER STAGES OPERATION 443.

In one embodiment, at ANALYZE METADATA ASSOCIATED WITH THE MESSAGE GENERATED BY THE ONE OR MORE METADATA GENERATING HEURISTIC FILTER STAGES OPERATION 443 the metadata set associated with the message from ANALYZE MESSAGE USING ONE OR MORE METADATA GENERATING HEURISTIC FILTER STAGES OPERATION 433 is analyzed using one or more metadata-based 419 message identification parameters to determine if the message is a potential 419 message.

In various embodiments, at ANALYZE METADATA ASSOCIATED WITH THE MESSAGE GENERATED BY THE ONE OR MORE METADATA GENERATING HEURISTIC FILTER STAGES OPERATION 443 at least part of the data representing one or more metadata-based 419 message identification parameters is entered into a computing system, such as user computing system(s) 100 of FIGS. 1 and 2 and/or a security system provider's computing system, such as security system provider computing system 150 of FIGS. 1 and 3 via one or more user interface devices such as, but not limited to, keyboards 207 and 307, mice 211 and 311, a touchpad, a touch screen, voice recognition and/or command software, or any other device for converting user actions into one or more computing system instructions as discussed herein, and/or as known in the art at the time of filing, and/or as developed after the time of filing.

Returning to FIG. 4, in various embodiments, at ANALYZE METADATA ASSOCIATED WITH THE MESSAGE GENERATED BY THE ONE OR MORE METADATA GENERATING HEURISTIC FILTER STAGES OPERATION 443 at least part of the data representing one or more metadata-based 419 message identification parameters is entered into a security system module, such as security system modules 241 and/or 341 of FIGS. 2 and 3, used to monitor e-mails, or other messages, coming into, and/or through, a computing system. In one embodiment, the security system is implemented, in whole or in part: on a given user's computing system, such as user computing system(s) 100 of FIGS. 1 and 2; on a security system provider's computing system, such as security system provider computing system 150 of FIGS. 1 and 3; on a third party computing system; on a server computing system; or on any combination of a given user's computing system, a security system provider's computing system, a server computing system, and/or a third party computing system.

Returning to FIG. 4, in various embodiments, at ANALYZE METADATA ASSOCIATED WITH THE MESSAGE GENERATED BY THE ONE OR MORE METADATA GENERATING HEURISTIC FILTER STAGES OPERATION 443 at least part of the data representing one or more metadata-based 419 message identification parameters resides on the user computing system, such as user computing system(s) 100 of FIGS. 1 and 2. As noted above, in some embodiments, a user computing system includes a user memory system, such as user memory 230 (FIG. 2) that can store data and/or instructions associated with, but not limited to, a security system in a security system module, such as security system module 241 (FIG. 2) that includes procedures, data, and/or instructions, used by one or more processors, such as CPU(s) 201 (FIG. 2) and CPU(s) 301 (FIG. 3), for monitoring e-mail, or other messages, coming into, and/or through, the user computing system, such as user computing system(s) 100, and/or communicating with a security system provider computing system, such as security system provider computing system 150, of FIG. 1.

Returning to FIG. 4, in various embodiments, at ANALYZE METADATA ASSOCIATED WITH THE MESSAGE GENERATED BY THE ONE OR MORE METADATA GENERATING HEURISTIC FILTER STAGES OPERATION 443 at least part of the data representing one or more metadata-based 419 message identification parameters resides on the security system provider computing system, such as security system provider computing system(s) 150 of FIGS. 1 and 3. As noted above, in some embodiments, a security system provider computing system includes a security system memory system, such as security system memory 330 (FIG. 3) that can store data and/or instructions associated with, but not limited to, a security system in a security system module, such as security system module 341 (FIG. 3) that includes procedures, data, and/or instructions, used by one or more processors, such as CPU(s) 201 (FIG. 2) and CPU(s) 301 (FIG. 3), for monitoring e-mail, or other messages, coming into, and/or through, the user computing system, such as user computing system(s) 100, and/or communicating with a security system provider computing system, such as security system provider computing system 150, of FIG. 1.

In one embodiment, at ANALYZE METADATA ASSOCIATED WITH THE MESSAGE GENERATED BY THE ONE OR MORE METADATA GENERATING HEURISTIC FILTER STAGES OPERATION 443, the metadata set associated with the message from ANALYZE MESSAGE USING ONE OR MORE METADATA GENERATING HEURISTIC FILTER STAGES OPERATION 433 is analyzed using one or more metadata-based 419 message identification parameters to determine if the message is a potential 419 message using, and/or under the direction of, one or more processors, such as CPU(s) 201 and/or 301 of FIGS. 2 and 3, associated with one or more computing systems, such as computing systems 100 and/or 150 of FIGS. 1, 2, and 3.

In one embodiment, once the metadata set associated with the message from ANALYZE MESSAGE USING ONE OR MORE METADATA GENERATING HEURISTIC FILTER STAGES OPERATION 433 is analyzed using one or more metadata-based 419 message identification parameters at ANALYZE METADATA ASSOCIATED WITH THE MESSAGE GENERATED BY THE ONE OR MORE METADATA GENERATING HEURISTIC FILTER STAGES OPERATION 443, process flow proceeds to SUSPECT? OPERATION 445.

In one embodiment, at SUSPECT? OPERATION 445 a determination is made by virtue of the analysis provided by ANALYZE MESSAGE USING ONE OR MORE METADATA GENERATING HEURISTIC FILTER STAGES OPERATION 433, as to whether or not a message is a potential 419 message.

In one embodiment, if, by virtue of the analysis provided by analysis provided by ANALYZE MESSAGE USING ONE OR MORE METADATA GENERATING HEURISTIC FILTER STAGES OPERATION 433, a message is deemed not to be suspect, i.e., the message does not include/match a threshold number of the one or more metadata-based 419 message identification parameters of ANALYZE MESSAGE USING ONE OR MORE METADATA GENERATING HEURISTIC FILTER STAGES OPERATION 433, process flow proceeds to PASS MESSAGE, REMOVE MESSAGE FROM PIPELINE OPERATION 446.

In one embodiment, at PASS MESSAGE, REMOVE MESSAGE FROM PIPELINE OPERATION 446 data representing the status of the message is transformed to data indicating a status of potentially legitimate and the message is removed from further live, or on-line, analysis by process for identifying 419 messages in a live message stream 400.

On the other hand, if, by virtue of the analysis provided by ANALYZE MESSAGE USING ONE OR MORE METADATA GENERATING HEURISTIC FILTER STAGES OPERATION 433, a message is deemed to be suspect, i.e., the message includes/matches a threshold number of the one or more metadata-based 419 message identification parameters of ANALYZE MESSAGE USING ONE OR MORE METADATA GENERATING HEURISTIC FILTER STAGES OPERATION 433, or is otherwise identified as a 419 message, data representing the status of the message is transformed to data indicating a status of 419 message, and process flow proceeds to IDENTIFY ONE OR MORE POTENTIAL 419 MESSAGE PARAMETERS ASSOCIATED WITH THE IDENTIFIED 419 MESSAGE AND PROVIDE THE ONE OR MORE POTENTIAL 419 MESSAGE PARAMETERS TO THE FEEDBACK BASED HEURISTIC FILTER STAGE OPERATION 447.

In one embodiment, at IDENTIFY ONE OR MORE POTENTIAL 419 MESSAGE PARAMETERS ASSOCIATED WITH THE IDENTIFIED 419 MESSAGE AND PROVIDE THE ONE OR MORE POTENTIAL 419 MESSAGE PARAMETERS TO THE FEEDBACK BASED HEURISTIC FILTER STAGE OPERATION 447 the message determined to be a 419 message by virtue of the analysis provided by ANALYZE MESSAGE USING ONE OR MORE METADATA GENERATING HEURISTIC FILTER STAGES OPERATION 433 is further analyzed to identify one or more potential 419 message parameters associated with the message and, in one embodiment, once one or more potential 419 message parameters associated with the message are identified, data representing the one or more potential 419 message parameters associated with the message is transformed into feedback-based potential 419 message parameter data and provided to the dynamic feedback-based heuristic filter stage of ANALYZE MESSAGE USING A FEEDBACK-BASED HEURISTIC FILTER STAGE OPERATION 413 to be used to create one or more new feedback-based heuristics.

In one embodiment, at IDENTIFY ONE OR MORE POTENTIAL 419 MESSAGE PARAMETERS ASSOCIATED WITH THE IDENTIFIED 419 MESSAGE AND PROVIDE THE ONE OR MORE POTENTIAL 419 MESSAGE PARAMETERS TO THE FEEDBACK BASED HEURISTIC FILTER STAGE OPERATION 447 the message is further analyzed to identify one or more potential 419 message parameters associated with the message such as, but not limited to: defined senders, defined sender systems, attached URLs, phone numbers, points of origin, text, formatting, etc.

In one embodiment, at IDENTIFY ONE OR MORE POTENTIAL 419 MESSAGE PARAMETERS ASSOCIATED WITH THE IDENTIFIED 419 MESSAGE AND PROVIDE THE ONE OR MORE POTENTIAL 419 MESSAGE PARAMETERS TO THE FEEDBACK BASED HEURISTIC FILTER STAGE OPERATION 447 the message is further analyzed to identify one or more potential 419 message parameters associated with the message using, and/or under the direction of, one or more processors, such as CPU(s) 201 and/or 301 of FIGS. 2 and 3, associated with one or more computing systems, such as computing systems 100 and/or 150 of FIGS. 1, 2, and 3.

In one embodiment, once one or more potential 419 message parameters associated with the message are identified at IDENTIFY ONE OR MORE POTENTIAL 419 MESSAGE PARAMETERS ASSOCIATED WITH THE IDENTIFIED 419 MESSAGE AND PROVIDE THE ONE OR MORE POTENTIAL 419 MESSAGE PARAMETERS TO THE FEEDBACK BASED HEURISTIC FILTER STAGE OPERATION 447, data representing the one or more potential 419 message parameters associated with the message is transformed to feedback-based potential 419 message parameter data.

In one embodiment, at IDENTIFY ONE OR MORE POTENTIAL 419 MESSAGE PARAMETERS ASSOCIATED WITH THE IDENTIFIED 419 MESSAGE AND PROVIDE THE ONE OR MORE POTENTIAL 419 MESSAGE PARAMETERS TO THE FEEDBACK BASED HEURISTIC FILTER STAGE OPERATION 447 the feedback-based potential 419 message parameter data is provided to the dynamic feedback-based heuristic filter stage of ANALYZE MESSAGE USING A FEEDBACK-BASED HEU- RISTIC FILTER STAGE OPERATION 413 to be used to create one or more new feedback-based heuristics.

In various embodiments, at IDENTIFY ONE OR MORE POTENTIAL 419 MESSAGE PARAMETERS ASSOCIATED WITH THE IDENTIFIED 419 MESSAGE AND PROVIDE THE ONE OR MORE POTENTIAL 419 MESSAGE PARAMETERS TO THE FEEDBACK BASED HEURISTIC FILTER STAGE OPERATION 447 the feedback-based potential 419 message parameter data is provided to the dynamic feedback-based heuristic filter stage of ANALYZE MESSAGE USING A FEEDBACK-BASED HEURISTIC FILTER STAGE OPERATION 413 via a computing system, such as user computing system(s) 100 of FIGS. 1 and 2 and/or a security system provider's computing system, such as security system provider computing system 150 of FIGS. 1 and 3.

In various embodiments, at IDENTIFY ONE OR MORE POTENTIAL 419 MESSAGE PARAMETERS ASSOCIATED WITH THE IDENTIFIED 419 MESSAGE AND PROVIDE THE ONE OR MORE POTENTIAL 419 MESSAGE PARAMETERS TO THE FEEDBACK BASED HEURISTIC FILTER STAGE OPERATION 447 the feedback-based potential 419 message parameter data is provided to the dynamic feedback-based heuristic filter stage of ANALYZE MESSAGE USING A FEEDBACK-BASED HEURISTIC FILTER STAGE OPERATION 413 via security system module, such as security system modules 241 and/or 341 of FIGS. 2 and 3, used to monitor e-mails, or other messages, coming into, and/or through, a computing system. In one embodiment, the security system is a software application, a software module, a hardware device, and/or a combination of software and hardware, implemented, in whole or in part: on a given user's computing system, such as user computing system(s) 100 of FIGS. 1 and 2; on a security system provider's computing system, such as security system provider computing system 150 of FIGS. 1 and 3; on a third party computing system; on a server computing system; or on any combination of a given user's computing system, a security system provider's computing system, a server computing system, and/or a third party computing system.

In one embodiment, at IDENTIFY ONE OR MORE POTENTIAL 419 MESSAGE PARAMETERS ASSOCIATED WITH THE IDENTIFIED 419 MESSAGE AND PROVIDE THE ONE OR MORE POTENTIAL 419 MESSAGE PARAMETERS TO THE FEEDBACK BASED HEURISTIC FILTER STAGE OPERATION 447 the feedback-based potential 419 message parameter data is provided to the dynamic feedback-based heuristic filter stage of ANALYZE MESSAGE USING A FEEDBACK-BASED HEURISTIC FILTER STAGE OPERATION 413 via any mechanism, means, process and/or procedure for transferring data discussed herein, and/or as known in the art at the time of filing, and/or as developed after the time of filing.

In one embodiment, in addition to providing feedback-based potential 419 message parameter data to the dynamic feedback-based heuristic filter stage of ANALYZE MESSAGE USING A FEEDBACK-BASED HEURISTIC FILTER STAGE OPERATION 413 at IDENTIFY ONE OR MORE POTENTIAL 419 MESSAGE PARAMETERS ASSOCIATED WITH THE IDENTIFIED 419 MESSAGE AND PROVIDE THE ONE OR MORE POTENTIAL 419 MESSAGE PARAMETERS TO THE FEEDBACK BASED HEURISTIC FILTER STAGE OPERATION 447, data representing one or more feedback-based potential legitimate message parameters are provided to the whitelist filter stage of ANALYZE MESSAGE USING A WHITELIST FILTER STAGE OPERATION 403.

In one embodiment, if, by virtue of the analysis performed at ANALYZE METADATA ASSOCIATED WITH THE MESSAGE GENERATED BY THE ONE OR MORE METADATA GENERATING HEURISTIC FILTER STAGES OPERATION 443, a message is not deemed to be a 419 message, i.e., the message does not include/match a threshold number of the one or more metadata-based 419 message identification parameters of ANALYZE METADATA ASSOCIATED WITH THE MESSAGE GENERATED BY THE ONE OR MORE METADATA GENERATING HEURISTIC FILTER STAGES OPERATION 443, or is otherwise identified as a non-419 message, data representing the status of the message is transformed to data indicating a status of a non-419 message and the message is further analyzed to identify one or more potential legitimate message parameters associated with the message. In one embodiment, once one or more potential legitimate message parameters associated with the message are identified, data representing the one or more potential legitimate message parameters associated with the message is transformed into feedback-based potential legitimate message parameter data and provided to the whitelist filter stage of ANALYZE MESSAGE USING A WHITELIST FILTER STAGE OPERATION 403.

In one embodiment, once the message determined to be a 419 message by virtue of the analysis provided by ANALYZE MESSAGE USING ONE OR MORE METADATA GENERATING HEURISTIC FILTER STAGES OPERATION 433 is further analyzed to identify one or more potential 419 message parameters associated with the message and, in one embodiment, once one or more potential 419 message parameters associated with the message are identified, and data representing the one or more potential 419 message parameters associated with the message is transformed into feedback-based potential 419 message parameter data and provided to the dynamic feedback-based heuristic filter stage of ANALYZE MESSAGE USING A FEEDBACK-BASED HEURISTIC FILTER STAGE OPERATION 413 to be used to create one or more new feedback-based heuristics at IDENTIFY ONE OR MORE POTENTIAL 419 MESSAGE PARAMETERS ASSOCIATED WITH THE IDENTIFIED 419 MESSAGE AND PROVIDE THE ONE OR MORE POTENTIAL 419 MESSAGE PARAMETERS TO THE FEEDBACK BASED HEURISTIC FILTER STAGE OPERATION 447, process flow proceeds to TAKE PROTECTIVE ACTION OPERATION 449.

In one embodiment, at TAKE PROTECTIVE ACTION OPERATION 449 the message determined to be a 419 message by virtue of the analysis provided by ANALYZE MESSAGE USING ONE OR MORE METADATA GENERATING HEURISTIC FILTER STAGES OPERATION 433 is subjected to one or more protective actions.

In one embodiment, the one or more protective actions of TAKE PROTECTIVE ACTION OPERATION 449 include, but are not limited to: blocking; quarantining; further analysis; labeling and/or tagging as spam/scam or potential spam/scam; redirection to a specific address and/or location for further processing; buffering; or any other protective measure discussed herein, and/or as known in the art at the time of filing, and/or as developed after the time of filing.

In one embodiment, once the message determined to be a 419 message by virtue of the analysis provided by ANALYZE MESSAGE USING ONE OR MORE METADATA GENERATING HEURISTIC FILTER STAGES OPERATION 433 is subjected to one or more protective actions at TAKE PROTECTIVE ACTION OPERATION 449 process flow proceeds to EXIT OPERATION 451. In one embodiment, at EXIT OPERATION 451 process for identifying 419 messages in a live message stream 400 is exited to await new data.

Using one embodiment of process for identifying 419 messages in a live message stream 400, 419 messages can be reliably identified in a live message stream, i.e., in relative "real time", using an anti-spam pipeline that includes, in one embodiment, a whitelist filter stage, a dynamic feedback-based heuristic filter stage, a 419 text-based heuristic filter stage, one or more metadata creating heuristic filter stages, and a metadata analysis stage. In addition, using process for identifying 419 messages in a live message stream 400, a message is removed from the live analysis of the anti-spam pipeline at any stage where the message is identified as either a potential 419 message or a potential legitimate message. Consequently, processing costs are minimized since no resources are used on messages that have already been classified as either a potential 419 message or a potential legitimate message. In addition, using process for identifying 419 messages in a live message stream 400, even when a given message is processed by the entire anti-spam pipeline, and the costs are incurred, the information obtained by the application of the entire anti-spam pipeline is used to teach and refine process for identifying 419 messages in a live message stream 400. Consequently, the cost of applying the entire anti-spam pipeline to a message is potentially offset by valuable feedback results obtained that help improve future processing speed and accuracy.

As a result, using process for identifying 419 messages in a live message stream 400, far more of these harmful, and at times dangerous, e-mails can be identified and stopped than is possible using currently available methods and systems.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

Herein, embodiments have been discussed with reference to the accompanying FIG.s, which depict one or more exemplary embodiments. The above description includes reference to specific embodiments for illustrative purposes. However, the illustrative discussion above is not intended to be exhaustive or to limit the invention to the precise forms disclosed. Many modifications and variations are possible in view of the teachings below. The embodiments discussed above were chosen and described in order to explain the principles of the invention, and its practical applications, to thereby enable others skilled in the art to utilize the invention and various embodiments with various modifications as may be suited to the particular use contemplated. Therefore, embodiments may be embodied in many different forms than those shown and discussed herein and should not be construed as limited to the embodiments set forth herein, shown in the FIG.s, and/or described below. In addition, the nomenclature used for components, capitalization of component designations and terms, the attributes, data structures, or any other programming or structural aspect is not significant, mandatory, or limiting, and the mechanisms that implement the invention or its features can have various different names, formats, and/or protocols. Further, the system and/or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic and/or algorithm-like descriptions and representations are the means used by those of skill in the art to most effectively and efficiently convey the substance of their work to others of skill in the art. These operations, while described functionally or logically, are understood to be implemented by computer programs and/or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as "monitoring", "obtaining", "identifying", "storing", "saving", "analyzing", "comparing", "calculating", "processing", "using", etc., refer to the action and processes of a computing system or similar electronic device that manipulates and operates on data represented as physical (electronic) quantities within the computing system memories, resisters, caches or other information storage, transmission or display devices.

Certain aspects of the present invention include process steps or operations and instructions described herein in an algorithmic and/or algorithmic-like form. It should be noted that the process steps and/or operations and instructions of the present invention can be embodied in software, firmware, and/or hardware, and when embodied in software, can be downloaded to reside on and be operated from different platforms used by real time network operating systems.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as defined herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicably coupled to similar and/or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s, and/or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A computing system implemented process for identifying 419 messages in a live message stream comprising:
    subjecting a message from a live message stream directed to a user computing system to an anti-spam pipeline, the anti-spam pipeline including:
        a dynamic feedback-based heuristic filter stage, the dynamic feedback-based heuristic filter stage using one or more processors associated with one or more computing systems to analyze the message using heuristics utilizing one or more feedback-based potential 419 message parameters obtained from actual 419 messages identified by historical applications of the process for identifying 419 messages in a live message stream;
        if, as a result of the analysis of the message by the dynamic feedback-based heuristic filter stage, the message is determined to be a potential 419 message, removing the message from further processing by the computing system implemented process for identifying 419 messages in a live message stream;
        if, as a result of the analysis of the message by the dynamic feedback-based heuristic filter stage, the message is not determined to be a potential 419 message, transferring the message to a 419 text-based heuristic filter stage, the 419 text-based heuristic filter stage using one or more processors associated with one or more computing systems to analyze the message using heuristics utilizing one or more text based 419 identification parameters;
        if, as a result of the analysis of the message by the 419 text-based heuristic filter stage, the message is determined to be a potential 419 message, removing the message from further processing by the computing system implemented process for identifying 419 messages in a live message stream;
        if, as a result of the analysis of the message by 419 text-based heuristic filter stage, the message is not determined to be a potential 419 message, transferring the message to one or more metadata creating heuristic filter stages, the one or more metadata creating heuristic filter stages using one or more processors associated with one or more computing systems to analyze the message and generate a metadata set including one or more metadata entries associated with the message;
        transferring the message and the metadata set including one or more metadata entries associated with the message to a metadata analysis stage, the metadata analysis stage using one or more processors associated with one or more computing systems to analyze the metadata set including one or more metadata entries associated with the message using heuristics utilizing one or more metadata-based 419 message identification parameters;
        if, as a result of the analysis of the message by the metadata analysis stage, the message is not determined to be a potential 419 message, removing the message from further processing by the computing system implemented process for identifying 419 messages in a live message stream;
    if, as a result of the analysis of the message by the metadata analysis stage, the message is determined to be a potential 419 message, using one or more processors associated with one or more computing systems to transform data indicating a status of the message determined to be a potential 419 message to data indicating the message is a potential 419 message;
    using one or more processors associated with one or more computing systems to analyze the potential 419 message to identify one or more potential 419 message parameters associated with the message;
    using one or more processors associated with one or more computing systems to transform data representing the one or more potential 419 message parameters associated with the message to data representing one or more feedback-based 419 message parameters; and
    using one or more processors associated with one or more computing systems to transfer the data representing one or more feedback-based 419 message parameters to the dynamic feedback-based heuristic filter stage of the anti-spam pipeline for use with one or more heuristics.

2. The computing system implemented process for identifying 419 messages in a live message stream of claim 1, wherein:
    the message is an e-mail.

3. The computing system implemented process for identifying 419 messages in a live message stream of claim 1, wherein:
    at least one feedback-based potential 419 message parameter is selected from the group of feedback-based potential 419 message parameters consisting of:
    defined senders;
    defined sender systems;
    defined attached URLs;
    defined phone numbers;
    defined points of message origin;
    defined text; and
    defined formatting.

4. The computing system implemented process for identifying 419 messages in a live message stream of claim 1, further comprising:
    if, as a result of the analysis of the message by the dynamic feedback-based heuristic filter stage, the message is determined to be a potential 419 message, in addition to removing the message from further processing by the computing system implemented process for identifying 419 messages in a live message stream, data indicating a status of the message is transformed to data indicating a status of potential 419 message and the message is subjected to one or more protective actions.

5. The computing system implemented process for identifying 419 messages in a live message stream of claim 4, wherein:
  at least one of the one or more protective actions is selected from the group of protective actions consisting of:
  blocking the message from the user computing system;
  quarantining the message;
  performing further analysis of the message;
  labeling or tagging the message as spam/scam or potential spam/scam;
  redirection of the message to a specific address or location for further processing; and
  buffering the message.

6. The computing system implemented process for identifying 419 messages in a live message stream of claim 1, wherein:
  at least one text based 419 identification parameter is selected from the group of text based 419 identification parameters consisting of:
  typing errors and grammatical errors determined to be associated with 419 messages;
  defined words determined to be associated with 419 messages;
  defined phrases determined to be associated with 419 messages;
  defined phone numbers determined to be associated with 419 messages; and
  defined number or symbol sequences determined to be associated with 419 messages.

7. The computing system implemented process for identifying 419 messages in a live message stream of claim 1, further comprising:
  if, as a result of the analysis of the message by the 419 text-based heuristic filter stage, the message is determined to be a potential 419 message, in addition to removing the message from further processing by the computing system implemented process for identifying 419 messages in a live message stream, data indicating a status of the message is transformed to data indicating a status of potential 419 message and the message is subjected to one or more protective actions.

8. A computing system implemented process for identifying 419 messages in a live message stream comprising:
  subjecting a message from a live message stream directed to a user computing system to an anti-spam pipeline, the anti-spam pipeline including:
    a whitelist filter stage, the whitelist filter stage using one or more processors associated with one or more computing systems to analyze the message using heuristics utilizing one or more potential legitimate message parameters;
  if, as a result of the analysis of the message by the whitelist filter stage, the message is determined to be a potential legitimate message, removing the message from further processing by the computing system implemented process for identifying 419 messages in a live message stream;
  if, as a result of the analysis of the message by whitelist filter stage, the message is not determined to be a potential legitimate message, transferring the message to a dynamic feedback-based heuristic filter stage, the dynamic feedback-based heuristic filter stage using one or more processors associated with one or more computing systems to analyze the message using heuristics utilizing one or more feedback-based potential 419 message parameters obtained from actual 419 messages identified by historical applications of the process for identifying 419 messages in a live message stream;
  if, as a result of the analysis of the message by the dynamic feedback-based heuristic filter stage, the message is determined to be a potential 419 message, removing the message from further processing by the computing system implemented process for identifying 419 messages in a live message stream;
  if, as a result of the analysis of the message by the dynamic feedback-based heuristic filter stage, the message is not determined to be a potential 419 message, transferring the message to a 419 text-based heuristic filter stage, the 419 text-based heuristic filter stage using one or more processors associated with one or more computing systems to analyze the message using heuristics utilizing one or more text based 419 identification parameters;
  if, as a result of the analysis of the message by the 419 text-based heuristic filter stage, the message is determined to be a potential 419 message, removing the message from further processing by the computing system implemented process for identifying 419 messages in a live message stream;
  if, as a result of the analysis of the message by 419 text-based heuristic filter stage, the message is not determined to be a potential 419 message, transferring the message to one or more metadata creating heuristic filter stages, the one or more metadata creating heuristic filter stages using one or more processors associated with one or more computing systems to analyze the message and generate a metadata set including one or more metadata entries associated with the message;
  transferring the message and the metadata set including one or more metadata entries associated with the message to a metadata analysis stage, the metadata analysis stage using one or more processors associated with one or more computing systems to analyze the metadata set including one or more metadata entries associated with the message using heuristics utilizing one or more metadata-based 419 message identification parameters;
  if, as a result of the analysis of the message by the metadata analysis stage, the message is not determined to be a potential 419 message, removing the message from further processing by the computing system implemented process for identifying 419 messages in a live message stream;
  if, as a result of the analysis of the message by the metadata analysis stage, the message is determined to be a potential 419 message, using one or more processors associated with one or more computing systems to transform data indicating a status of the message determined to be a potential 419 message to data indicating the message is a potential 419 message;
using one or more processors associated with one or more computing systems to analyze the potential 419 message to identify one or more potential 419 message parameters associated with the message;
using one or more processors associated with one or more computing systems to transform data representing the one or more potential 419 message parameters associated with the message to data representing one or more feedback-based 419 message parameters; and using one or more processors associated with one or more computing systems to transfer the data representing one or more feedback-based 419 message parameters to the dynamic feedback-based heuristic filter stage of the anti-spam pipeline for use with one or more heuristics.

9. The computing system implemented process for identifying 419 messages in a live message stream of claim 8, wherein:

at least one feedback-based potential 419 message parameter is selected from the group of feedback-based potential 419 message parameters consisting of:

defined senders;
defined sender systems;
defined attached URLs;
defined phone numbers;
defined points of message origin;
defined text; and
defined formatting.

10. The computing system implemented process for identifying 419 messages in a live message stream of claim 8, further comprising:

if, as a result of the analysis of the message by the dynamic feedback-based heuristic filter stage, the message is determined to be a potential 419 message, in addition to removing the message from further processing by the computing system implemented process for identifying 419 messages in a live message stream, data indicating a status of the message is transformed to data indicating a status of potential 419 message and the message is subjected to one or more protective actions.

11. The computing system implemented process for identifying 419 messages in a live message stream of claim 10, wherein:

at least one of the one or more protective actions is selected from the group of protective actions consisting of:

blocking the message from the user computing system;
quarantining the message;
performing further analysis of the message;
labeling or tagging the message as spam/scam or potential spam/scam;
redirection of the message to a specific address or location for further processing; and
buffering the message.

12. The computing system implemented process for identifying 419 messages in a live message stream of claim 8, wherein:

at least one potential legitimate message parameter is selected from the group of potential legitimate message parameters consisting of:

text associated with vacation or out of office replies;
text indicating the sender is unable to respond;
addresses associated with known safe senders;
attached URLs associated with known safe senders;
phone numbers associated with known safe senders; and
points of origin associated with known safe senders.

13. The computing system implemented process for identifying 419 messages in a live message stream of claim 8, further comprising:

if, as a result of the analysis of the message by the whitelist filter stage, the message is determined to be a potential legitimate message, in addition to removing the message from further processing by the computing system implemented process for identifying 419 messages in a live message stream, data indicating a status of the message is transformed to data indicating a status of potential legitimate message.

14. The computing system implemented process for identifying 419 messages in a live message stream of claim 8, wherein:

at least one text based 419 identification parameter is selected from the group of text based 419 identification parameters consisting of:

typing errors and grammatical errors determined to be associated with 419 messages;
defined words determined to be associated with 419 messages;
defined phrases determined to be associated with 419 messages;
defined phone numbers determined to be associated with 419 messages; and
defined number or symbol sequences determined to be associated with 419 messages.

15. A system for identifying 419 messages in a live message stream comprising:

a user computing system;
a live message stream;
a message in the live message stream directed to the user computing system; and
one or more processors associated with one or more computing systems, the one or more processors implementing an anti-spam pipeline, the anti-spam pipeline including:

a dynamic feedback-based heuristic filter stage, the dynamic feedback-based heuristic filter stage using one or more of the one or more processors associated with one or more computing systems to analyze the message using heuristics utilizing one or more feedback-based potential 419 message parameters obtained from actual 419 messages identified by historical uses of the anti-spam pipeline;

a 419 text-based heuristic filter stage, the 419 text-based heuristic filter stage using one or more of the one or more processors associated with one or more computing systems to analyze the message using heuristics utilizing one or more text based 419 identification parameters; and one or more metadata creating heuristic filter stages, the one or more metadata creating heuristic filter stages using one or more of the one or more processors associated with one or more computing systems to analyze the message and generate a metadata set including one or more metadata entries associated with the message.

16. The system for identifying 419 messages in a live message stream of claim 15, wherein:

the message is an e-mail.

17. The system for identifying 419 messages in a live message stream of claim 15, wherein:

at least one feedback-based potential 419 message parameter is selected from the group of feedback-based potential 419 message parameters consisting of:

defined senders;
defined sender systems;
defined attached URLs;
defined phone numbers;
defined points of message origin;
defined text; and
defined formatting.

18. The system for identifying 419 messages in a live message stream of claim 15, wherein:
- at least one text based 419 identification parameter is selected from the group of text based 419 identification parameters consisting of:
- typing errors and grammatical errors determined to be associated with 419 messages;
- defined words determined to be associated with 419 messages;
- defined phrases determined to be associated with 419 messages;
- defined phone numbers determined to be associated with 419 messages; and
- defined number or symbol sequences determined to be associated with 419 messages.

19. The system for identifying 419 messages in a live message stream of claim 15, wherein the anti-spam pipeline further comprises:
- a whitelist filter stage implemented by one or more of the one or more processors associated with the one or more computing systems before the one or more metadata creating heuristic filter stages, the whitelist filter stage using one or more of the one or more processors associated with the one or more computing systems to analyze the message using heuristics utilizing one or more potential legitimate message parameters.

20. The system for identifying 419 messages in a live message stream of claim 19, wherein:
- at least one potential legitimate message parameter is selected from the group of potential legitimate message parameters consisting of:
- text associated with vacation or out of office replies;
- text indicating the sender is unable to respond;
- addresses associated with known safe senders;
- attached URLs associated with known safe senders;
- phone numbers associated with known safe senders; and
- points of origin associated with known safe senders.

* * * * *

UNITED STATES PATENT AND TRADEMARK OFFICE
CERTIFICATE OF CORRECTION

| | | |
|---|---|---|
| PATENT NO. | : 8,255,572 B1 | Page 1 of 1 |
| APPLICATION NO. | : 12/692283 | |
| DATED | : August 28, 2012 | |
| INVENTOR(S) | : Graham Coomer | |

It is certified that error appears in the above-identified patent and that said Letters Patent is hereby corrected as shown below:

In Column 29, Line 64, Claim 1, replace "by 419" with --by the 419--; and
In Column 32, Line 28, Claim 8, replace "by 419" with --by the 419--.

Signed and Sealed this
Ninth Day of October, 2012

David J. Kappos
*Director of the United States Patent and Trademark Office*